US008625049B2

(12) United States Patent
Kim et al.

(10) Patent No.: US 8,625,049 B2
(45) Date of Patent: Jan. 7, 2014

(54) BACKLIGHT UNIT AND LIQUID CRYSTAL DISPLAY INCLUDING THE SAME

(75) Inventors: Sangjeon Kim, Seoul (KR); Seonghwan Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 413 days.

(21) Appl. No.: 12/868,053

(22) Filed: Aug. 25, 2010

(65) Prior Publication Data

US 2011/0205464 A1 Aug. 25, 2011

Related U.S. Application Data

(60) Provisional application No. 61/306,514, filed on Feb. 21, 2010.

(30) Foreign Application Priority Data

Mar. 12, 2010 (KR) ........................ 10-2010-0022199

(51) Int. Cl.
G02F 1/1333 (2006.01)
G02F 1/1335 (2006.01)
G09F 13/04 (2006.01)
G09F 13/08 (2006.01)
F21V 7/04 (2006.01)

(52) U.S. Cl.
USPC ................ 349/62; 349/58; 349/65; 362/97.2; 362/97.3; 362/623; 362/633; 362/634

(58) Field of Classification Search
USPC ............ 349/58–65; 362/97.2–97.4, 362, 368, 362/606, 615, 623, 632–634
See application file for complete search history.

(56) References Cited

U.S. PATENT DOCUMENTS

| 6,950,154 | B2 | 9/2005 | Lee |
| 7,106,393 | B2 | 9/2006 | Lee |
| 7,118,265 | B2 * | 10/2006 | Cho ............................. 362/606 |
| 7,224,416 | B2 | 5/2007 | Cha et al. |
| 7,380,972 | B2 * | 6/2008 | Shimizu ....................... 362/632 |
| 7,505,668 | B2 | 3/2009 | Hong |
| 7,594,746 | B2 | 9/2009 | Shin et al. |
| 2003/0223020 | A1 | 12/2003 | Lee |
| 2005/0243238 | A1 | 11/2005 | Cha et al. |

(Continued)

FOREIGN PATENT DOCUMENTS

| JP | 2003-107467 A | 4/2003 |
| JP | 2004-279864 A | 10/2004 |

(Continued)

OTHER PUBLICATIONS

U.S. Office Action dated Sep. 28, 2012 for U.S. Appl. No. 12/868,072.

(Continued)

*Primary Examiner* — Uyen Chau N Le
*Assistant Examiner* — Michael Mooney
(74) *Attorney, Agent, or Firm* — KED & Associates, LLP

(57) ABSTRACT

A liquid crystal display includes a liquid crystal display panel, a backlight and a cover. The backlight includes optical sheets that are configured to be mounted to the cover using a plurality of holes provided on the optical sheet that material to corresponding protrusions provided on the cover. The holes and protrusions are configured to reduce damage or misalignment to the optical sheet that may be caused by heat generated inside the liquid crystal display.

18 Claims, 27 Drawing Sheets

(56) References Cited

U.S. PATENT DOCUMENTS

| | | |
|---|---|---|
| 2005/0254236 A1 | 11/2005 | Fu et al. ............... 362/186 |
| 2006/0007708 A1 | 1/2006 | Lee |
| 2006/0203519 A1 | 9/2006 | Shin et al. |
| 2007/0258264 A1 | 11/2007 | Hong |
| 2007/0297195 A1 | 12/2007 | Hu ............... 362/633 |
| 2008/0186425 A1 | 8/2008 | Chang et al. |

FOREIGN PATENT DOCUMENTS

| | | |
|---|---|---|
| JP | 2005-534071 A | 11/2005 |
| JP | 2006-253108 A | 9/2006 |
| JP | 2009-049017 A | 3/2009 |
| KR | 10-2007-0063290 A | 6/2007 |
| KR | 10-2007-0107482 A | 11/2007 |
| KR | 10-2008-0008743 A | 1/2008 |
| KR | 10-2008-0073597 A | 8/2008 |

OTHER PUBLICATIONS

International Search Report and Written Opinion dated Jun. 23, 2011 (PCT/KR2010/006982).

International Search Report and Written Opinion dated Jun. 27, 2011 (PCT/KR2010/006979).

European Search Report issued in Application No. 10846223.5 dated Jul. 12, 2013.

* cited by examiner (a)　　　　(b)　　　　(c)　　　　(d)　　　　(e)

BACKLIGHT UNIT AND LIQUID CRYSTAL DISPLAY INCLUDING THE SAME

CROSS-REFERENCE TO RELATED APPLICATION(S)

This application claims the benefit of Korean Patent Application No. 10-2010-0022199 filed in Korea on Mar. 12, 2010 and U.S. Provisional Application No. 61/306,514 filed on Feb. 21, 2010, which are hereby incorporated by reference.

BACKGROUND

1. Field

A backlight unit and a liquid crystal display including the same are disclosed herein.

2. Background

Back light units and liquid crystal displays including the same are known. However, they suffer from various disadvantages.

BRIEF DESCRIPTION OF THE DRAWINGS

The embodiments will be described in detail with reference to the following drawings in which like reference numerals refer to like elements, wherein.

DETAILED DESCRIPTION

Figure 1:
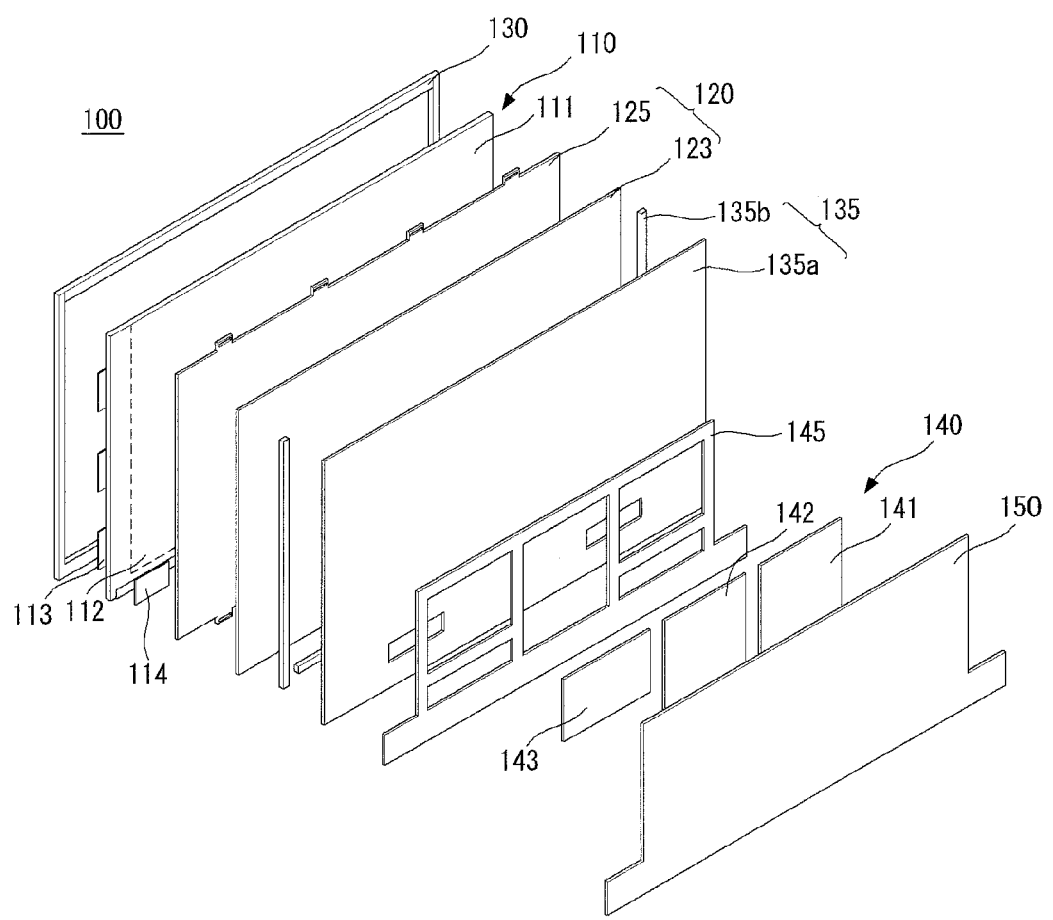
FIG. 1 illustrates a liquid crystal display (LCD) according to an embodiment.

FIG. 1 illustrates a liquid crystal display (LCD) according to a first embodiment of the invention. As shown in FIG. 1, the LCD 100 may include a liquid crystal display panel 110, a backlight unit 120, cover 130, housing 135, a driving unit 140, and a back case 150.

The liquid crystal display panel 110, on which an image may be displayed, may include a first and second substrates 111 and 112 attached to face a liquid crystal layer interposed therebetween. A plurality of scan lines and a plurality of data lines may cross in a matrix form to define a plurality of pixels on the first substrate 111 called a thin film transistor (TFT) array substrate. Each pixel may include a TFT to turn the pixel on or off and a pixel electrode to electrically connect the TFT. Red (R), green (G), and blue (B) color filters corresponding to the plurality of pixels and black matrixes surrounding the color filters and covering non-display elements such as the scan lines, the data lines, and the TFTs may be formed on the second substrate 112 called a color filter substrate.

In addition, a transparent common electrode covering the non-display elements may also be provided on the second substrate 112. A printed circuit board (PCB) may be connected to at least one side of the liquid crystal display panel 110 by a connection member such as a flexible circuit board or a tape carrier package (TCP), and may be tightly attached to a rear surface of the housing 135 during a modularization process.

In the liquid crystal display panel 110, when TFTs selected by the scan lines are turned on according to ON/OFF signals of a gate driving circuit 113, a data voltage of a data driving circuit 114 may be transferred to a corresponding pixel electrode through the data lines. Accordingly, an alignment direction of liquid crystal molecules may be changed by an electric field generated by the data voltage between the pixel electrode and the common electrode.

The LCD 100 according to an embodiment may include the backlight unit 120 that may provide light to the liquid crystal display panel 110 from a rear surface of the liquid crystal display panel 110. The backlight unit 120 may include an optical assembly 123 and a plurality of optical sheets 125 disposed on the optical assembly 123.

The liquid crystal display panel 110 and the backlight unit 120 may be modularized through the cover 130 and the housing 135. The cover 130 may be positioned on the front surface of the liquid crystal display panel 110, and may be a top cover shaped as a rectangular frame that may cover an upper surface and a side surface of the liquid crystal display panel 110. A front surface of the cover 130 may be open to allow displaying of an image generated on the liquid crystal display panel 110.

The housing 135 may be positioned on a rear surface of the backlight unit 120 and may include a bottom plate 135a and a supporting plate 135b. The bottom plate 135a may be a bottom cover, to which the liquid crystal display panel 110 and the backlight unit 120 are coupled, that may serve as a base for the LCD 100. The bottom plate 135a may be shaped as a single rectangular plate. The supporting plate 135b may support and couple the cover 130 and the bottom plate 135a.

The driving unit 140 may be disposed on one surface of the housing 135 positioned on the rear surface of the backlight unit 120. The driving unit 140 may include a driving controller 141, a main board 142, and a power supply unit 143. The driving controller 141 may be a timing controller that adjusts an operation timing of each driving circuit of the liquid crystal display panel 110. The main board 142 may transfer a vertical synchronous signal, a horizontal synchronous signal, and R, G, and B resolution signals to the timing controller. The power supply unit 143 may provide power to the liquid crystal display panel 110 and the backlight unit 120. The driving unit 140 may be coupled to the housing 135 by using a driving unit chassis 145. The driving unit 140 may be covered by the back case 150.

Figure 2:
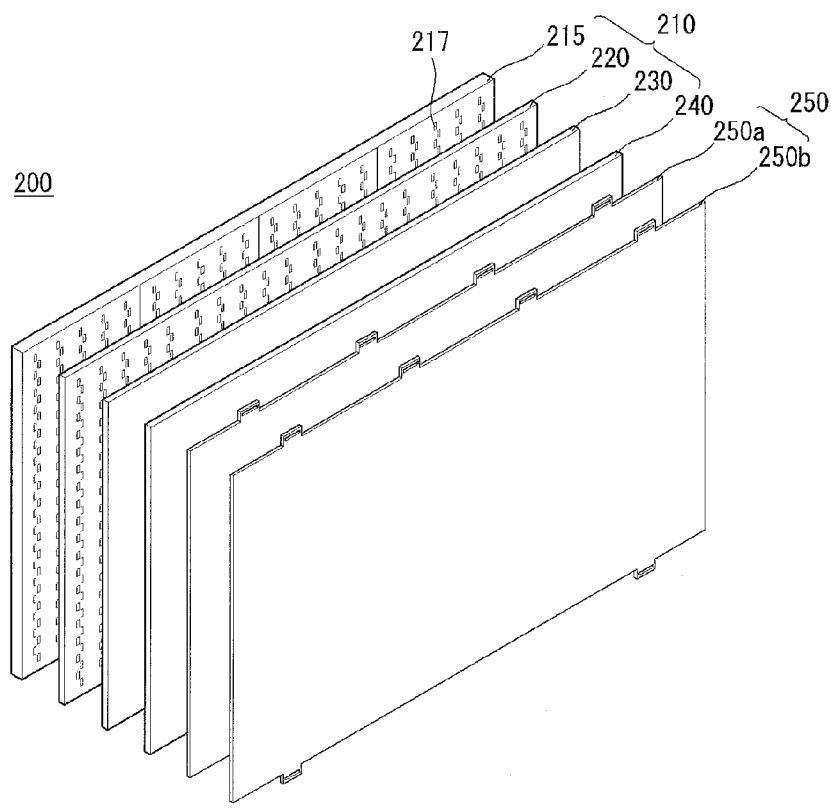
FIGS. 2 and 3 illustrate a backlight unit according to the embodiment.
Figure 3:
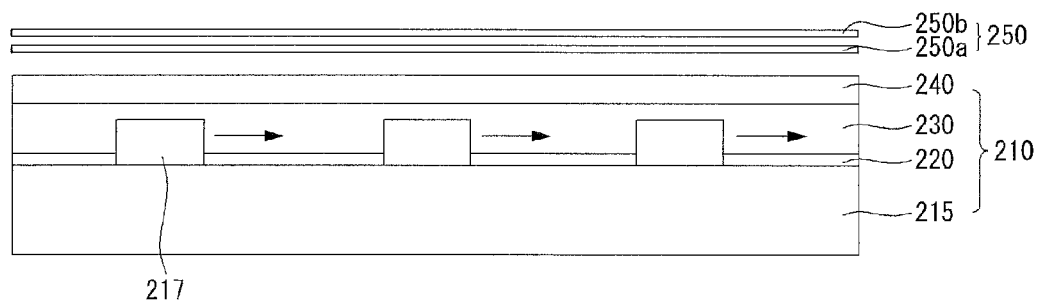

FIGS. 2 and 3 illustrate a backlight unit according to the first embodiment. Referring to FIGS. 2 and 3, the backlight unit 200 may include an optical assembly 210 and an optical sheet 250. The optical assembly 210 may include a first layer 215, a plurality of light sources 217, a reflective layer 220, a second layer 230, and a diffusion plate 240. The plurality of light sources 217 may be formed on the first layer 215, and the second layer 230 may be disposed on the first layer 215 to cover the plurality of light sources 217.

The first layer 215 may be a board (or substrate) on which the plurality of light sources 217 may be mounted. An electrode pattern may be formed on the first layer 215 in order to connect an adapter that may supply power and the light sources 217. For example, a carbon nano-tube (CNT) electrode pattern for connecting the light sources 217 and the adapter may be formed on an upper surface of the substrate. The first layer 215 may be a PCB formed of polyethylene terephthalate (PET), glass, polycarbonate (PC), silicon (Si), or other appropriate materials on which the plurality of light sources 217 may be mounted. The first layer 215 may also be formed as a film.

The light sources 217 may be one of a light emitting diode (LED) chip and an LED package including at least one LED chip. In this embodiment, simply for ease of explanation, light sources 217 will be described herein as having an LED package.

The LED package constituting the light sources 217 may be classified into a top view type LED package and a side view type LED package depending on the direction of a light emission surface. The light sources 217 may be configured by using at least one of a top view type LED package in which a light emission surface may be formed toward the upper side and a side view type LED package in which the light emission surface may be formed toward the side. When the light sources 217 are the side view type LED package, the light emission surface of each of the plurality of light sources 217 may be disposed on the side, and the plurality of light sources 217 may emit light in a lateral direction, for example, in the direction in which the first layer 215 or the reflective layer 220 extends. Thus, the thickness of the second layer 230 formed on the light sources 217 may be reduced, making the backlight unit 200 and the LCD 100 thinner.

The light sources 217 may be color LEDs that may emit at least one of red, blue, and green colors, or white LEDs. The colored LEDs may include at least one of red LEDs, blue LEDs, and green LEDs. Accordingly, the disposition and color of light emitted from the LEDs may be variably modified.

The second layer 230 may be disposed on the first layer 215 and may cover the plurality of light sources 217. The second layer 230 may allow light emitted from the light sources 217 to transmit therethrough and spread the light, whereby the light emitted from the light sources 217 may be uniformly provided to the liquid crystal display panel.

The reflective layer 220 may reflect light emitted from the light sources 217 and may be positioned on the first layer 215. The reflective layer 220 may be formed on an area of the first layer 215, other than the area where the light sources 217 are formed. For example, as shown in FIG. 3, reflective layer 220 may include recesses corresponding to the light sources 217 in which the light sources 217 may be positioned. The reflective layer 220 may reflect light emitted from the light sources 217 and reflect again light totally reflected from the boundary of the second layer 230 to further increase the area of light dispersion.

The reflective layer 220 may contain at least one of metal or a metal oxide, a reflective material. For example, the reflective layer 220 may be formed of metal or metal oxide having a high reflectance, for example, aluminum (Al), silver (Ag), gold (Au), titanium dioxide (TiO2), or other appropriate reflective materials. The reflective layer 220 may be formed by depositing or coating the metal or metal oxide on the first layer 215 or by printing metal ink on the first layer 215. Here, a vacuum deposition method, for example, a thermal deposition method, an evaporation method, a sputtering method, or other appropriate deposition methods may be used as the deposition method. Further, a printing method, a gravure coating method, a silk screen method, or other appropriate methods may be used as the coating or printing method.

The second layer 230 on the first layer 215 may be formed of a light-transmissive material, for example, a silicon or acrylic resin. However, the second layer 230 is not limited thereto and may be formed of various other resins. In order to allow the backlight unit 200 to have a uniform luminance in diffusing light emitted from the light sources 217, the second layer 230 may be formed of a resin having a refractive index of about 1.4 to 1.6. For example, the second layer 230 may be formed of polyethylene terephthalate (PET), polycarbonate (Pr), polypropylene (PP), polyethylene (PE), polystyrene (PS), polyepoxy (PE), silicon, acryl, or other appropriate materials.

The second layer 230 may include a polymer resin having an adhesive property so as to be firmly and tightly attached to the light sources 217 and the reflective layer 220. For example, the second layer 230 may be formed of acryl group, urethane group, epoxy group, and melamine group such as unsaturated polyester, methyl methacrylate, ethyl methacrylate, isobutyl methacrylate, n-butyl methacrylate, n-butyl methyl methacrylate, acrylic acid, methacrylic acid, hydroxyl ethyl methacrylate, hydroxyl propyl methacrylate, hydroxyl ethyl acrylate, acrylamide, methylol acrylamide, glycidyl methacrylate, ethyl acrylate, isobutyl acrylate, n-butyl acrylate, 2-ethyl hexyl acrylate polymer, copolymer, terpolymer, other appropriate materials.

The second layer 230 may be formed by coating a liquid or gel phase resin on the first layer 215 having the plurality of light sources 217 and the reflective layer 220 formed thereon, and then hardening the resin. Alternatively, the second layer 230 may be formed by coating a resin on a support sheet, partially hardening the resin, and then bonding the same to the first layer 215.

The diffusion plate 240 may be formed on the second layer 230 that may allow light emitted from the light sources 217 to be diffused upward. The diffusion plate 240 may be bonded to the second layer 230 using an additional adhesive member.

Figure 4A:
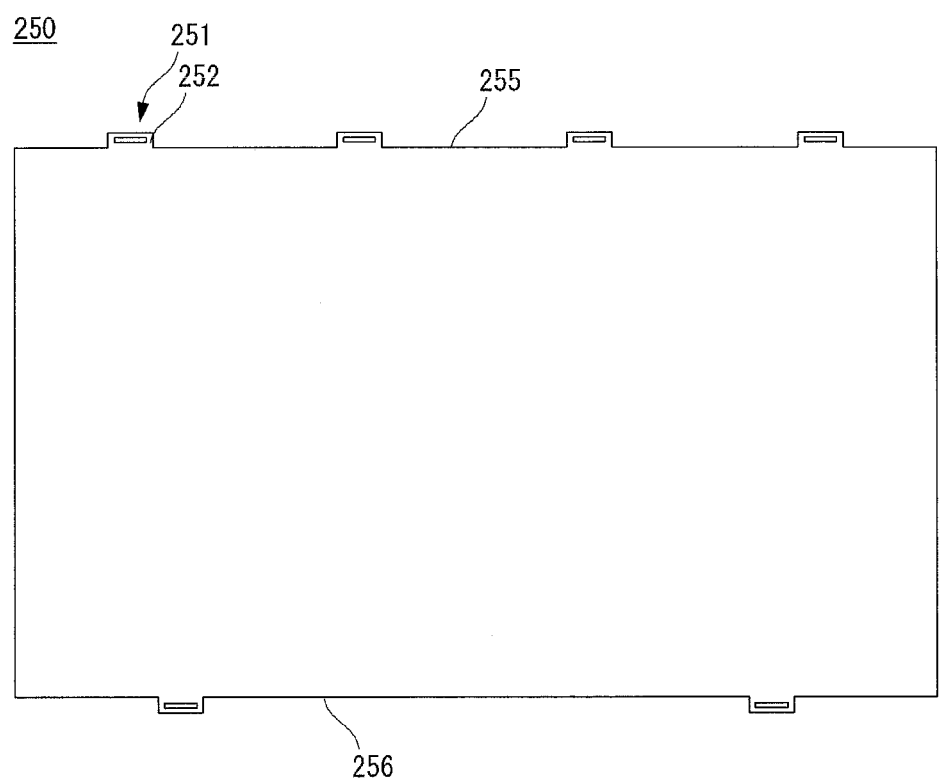
FIGS. 4A to 4K illustrate an optical sheet according to the embodiment.

FIGS. 4A to 4K illustrate an optical sheet according to the first embodiment. The optical sheet 250 may be positioned on the foregoing optical assembly 210. Referring to FIG. 4A, the optical sheet 250 according to this embodiment may be a diffusion sheet that may diffuse light outputted from the light sources or a prism sheet that may concentrate light.

The optical sheet 250 may include a plurality of holes or slots 251 on at least one side such that the optical sheet 250 may be coupled to the cover 130 or the housing 135. The optical sheet 250 may have a rectangular shape, and the plurality of holes 251 may be positioned on the upper side 255 and lower side 256 of the optical sheet 250. Here, the upper side 255 of the optical sheet 250 may correspond to an upper side of the LCD when assembled and positioned to stand or mounted for use. Likewise, the lower side 256 of the optical sheet 250 may correspond to a lower side of the LCD.

The holes 251 may be formed at protrusions or tabs 252 protruded from at least one side of the optical sheet 250, for example, at the upper side 255 and the lower side 256 of the optical sheet 250. The protrusions 252 may subsequently be coupled with the cover 130 or the housing 135, and may be formed such that they protrude from one side of the optical sheet 250.

The holes 251 formed at the protrusions 252 may have various shapes including a polygonal shape, a triangular shape, a circular shape, a quadrangular shape, or other appropriate shapes. Also, the protrusions 252 may have various shapes that allow the protrusions 252 to be easily coupled with the cover 130 or the housing 135. For example, the portions of the protrusions 252 in contact with the cover 130 or the housing 135 may have a large quadrangular shape.

The plurality of holes 251 may be formed such that a number of holes 251 formed on one of the plurality of sides of the optical sheet 250 is less than a number of holes 251 formed on another of the plurality of sides of the optical sheet 250. For example, as shown in FIG. 4A, the number of holes 251 formed on the upper side 255 of the optical sheet 250 may be greater than the number of holes 251 formed on the lower side 256 of the optical sheet 250. As discussed above, the upper side 255 of the optical sheet 250 may correspond to the upper side of the LCD when the LCD is assembled. In order to prevent the optical sheet 250 from sagging due to the weight of the LCD components when assembled, a greater number of holes 251 may be formed on the upper side 255.

A plurality of holes 251 may also be formed on the sides of the optical sheet 250 which face each other. For example, as shown in FIGS. 4A to 4F, the plurality of holes 251 may be positioned on the upper side 255 and the lower side 256 of the optical sheet 250 which face each other. The plurality of holes 251 may also be positioned on the left side 257 and the right side 258 of the optical sheet 250. Moreover, the plurality of holes 251 may be positioned on all sides, for example, on the upper side 255, the lower side 256, the left side 257, and the right side 258.

Figure 4B:
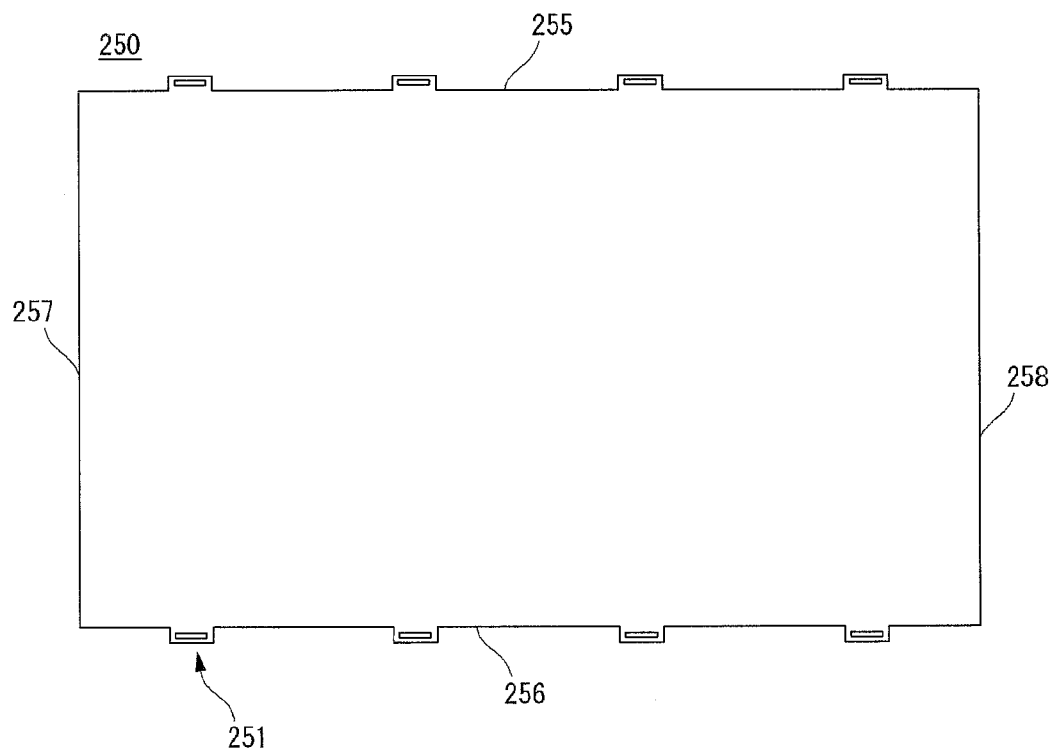

Referring to FIG. 4B, the plurality of holes 251 formed on the upper side 255 of the optical sheet 250 may be positioned to be symmetrical with the plurality of holes 251 formed on the lower side 256 of the optical sheet which faces the upper side 255. Alternatively, with reference to FIG. 4A, the plurality of holes 251 formed on the upper side 255 of the optical sheet 250 may be asymmetrical with the plurality of holes 251 formed on the lower side 256 of the optical sheet 250 which faces the holes 251 of the upper side 255.

Figure 4C:
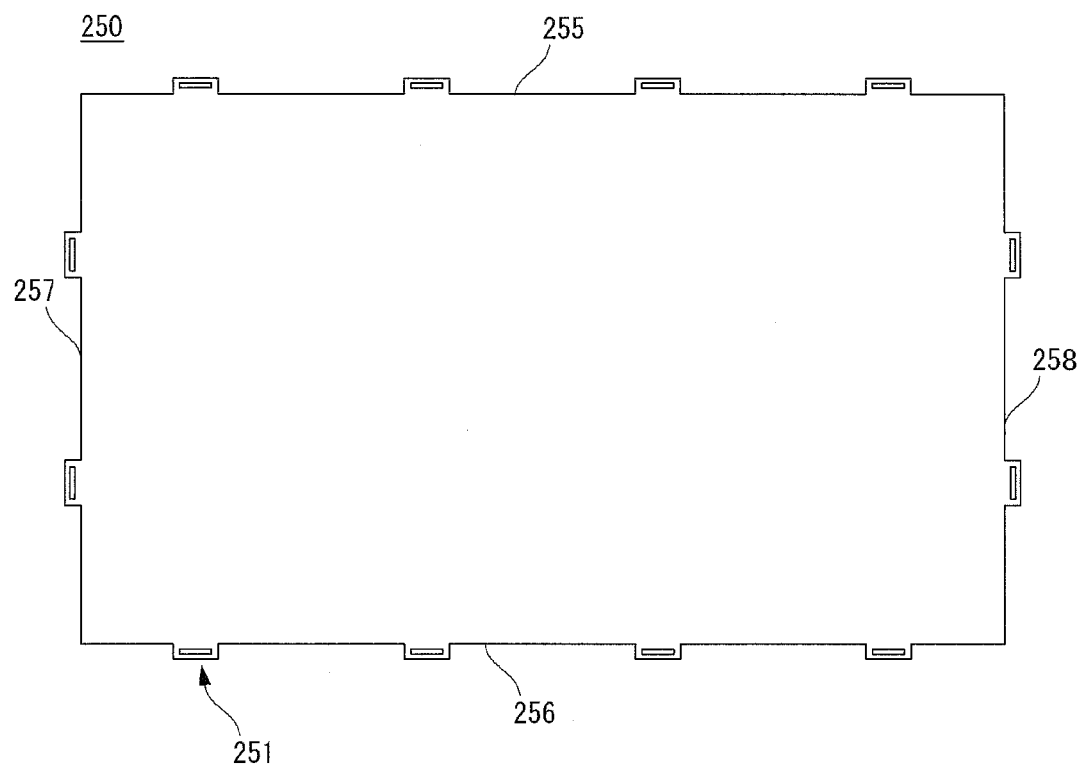
Figure 4D:
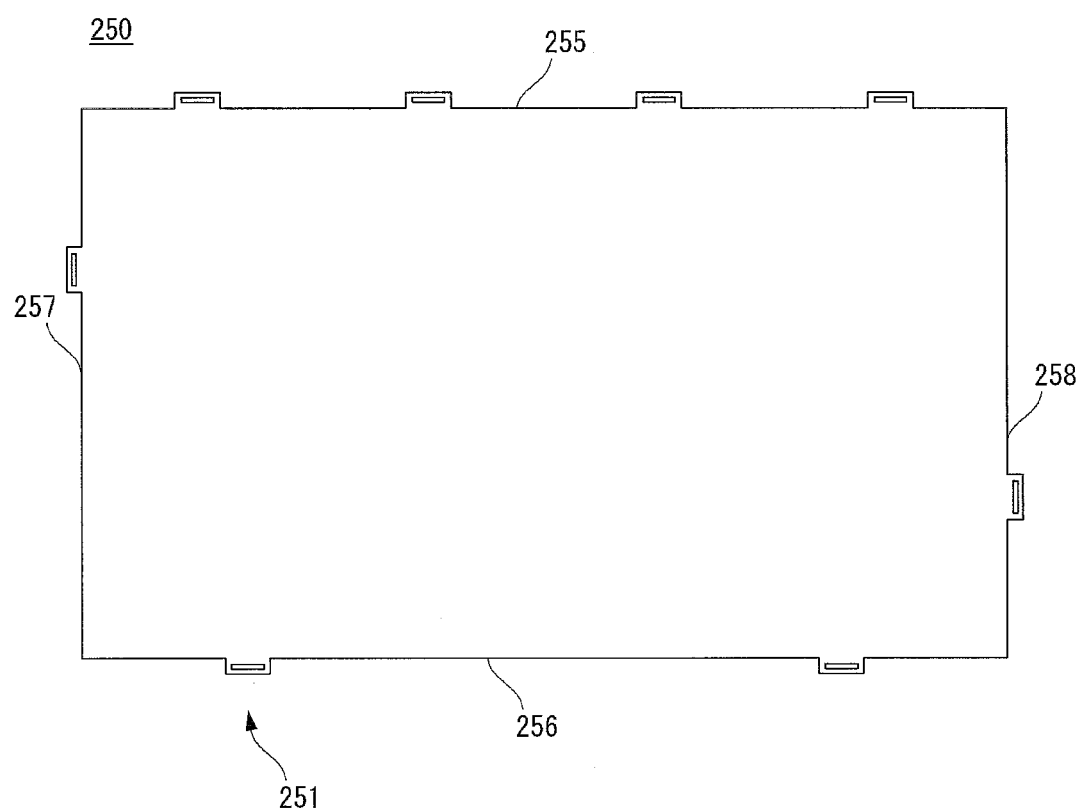

Referring to FIGS. 4C and 4D, the plurality of holes 251 may be positioned on all of the sides, for example, on the upper side 255, on the lower side 256, on the left side 257, and on the right side 258 of the optical sheet 250. Here, as shown in FIG. 4C, the plurality of holes 251 disposed on the upper side 255 of the optical sheet 250 may be symmetrical to the plurality of holes 251 disposed on the lower side 256 of the optical sheet 250, and the plurality of holes 251 disposed on the left side 257 of the optical sheet 250 may be symmetrical to the plurality of holes 251 disposed on the right side 258 of the optical sheet 250. Alternatively, as shown in FIG. 4D, the plurality of holes 251 disposed on the upper side 255 of the optical sheet 250 may be asymmetrical to the plurality of holes 251 disposed on the lower side 256 of the optical sheet 250, and the plurality of holes 251 disposed on the left side 257 of the optical sheet 250 may be asymmetrical to the plurality of holes 251 disposed on the right side 258 of the optical sheet 250.

Figure 4E:
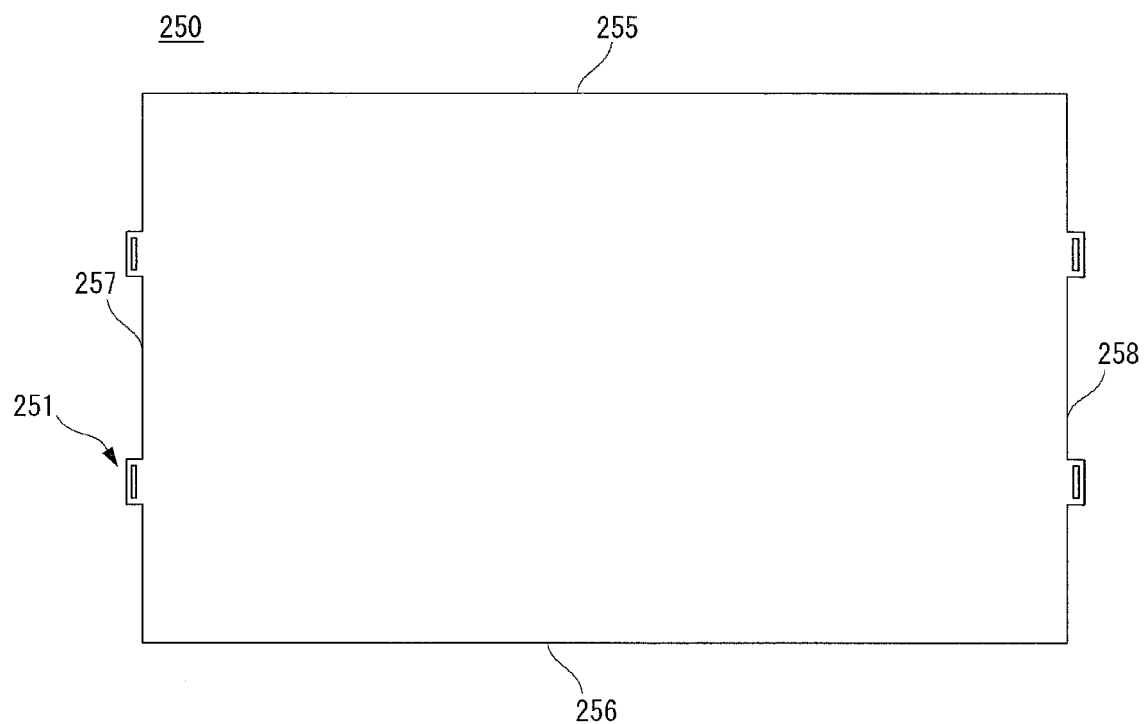
Figure 4F:
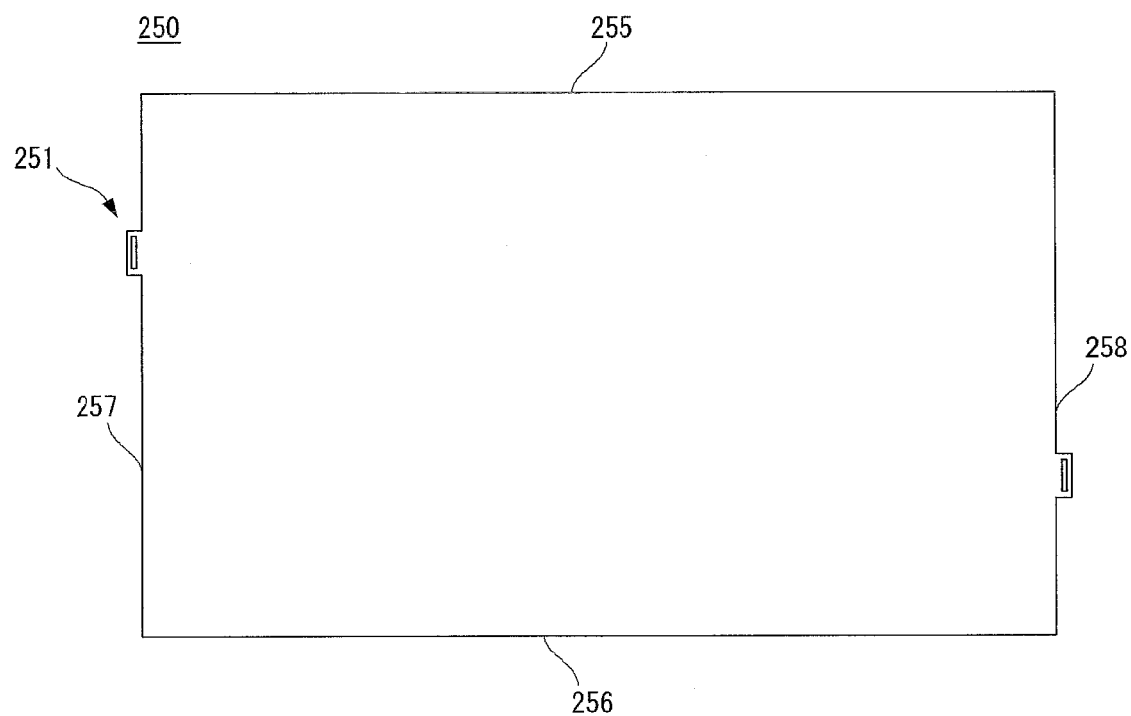

Referring to FIGS. 4E to 4F, the plurality of holes 251 may be positioned on the sides of the optical sheet 250, for example, on the left side 257 and right side 258 which face each other. Here, the plurality of holes 251 are not positioned on the upper and lower sides 255 and 256 of the optical sheet 250. As shown in FIG. 4E, the plurality of holes 251 disposed on the left side 257 of the optical sheet 250 may be symmetrical to the plurality of holes 251 disposed on the right side 258 of the optical sheet 250. Alternatively, as shown in FIG. 4F, the plurality of holes 251 disposed on the left side 257 of the optical sheet 250 may be asymmetrical to the plurality of holes 251 disposed on the right side 258 of the optical sheet 250.

Figure 4G:
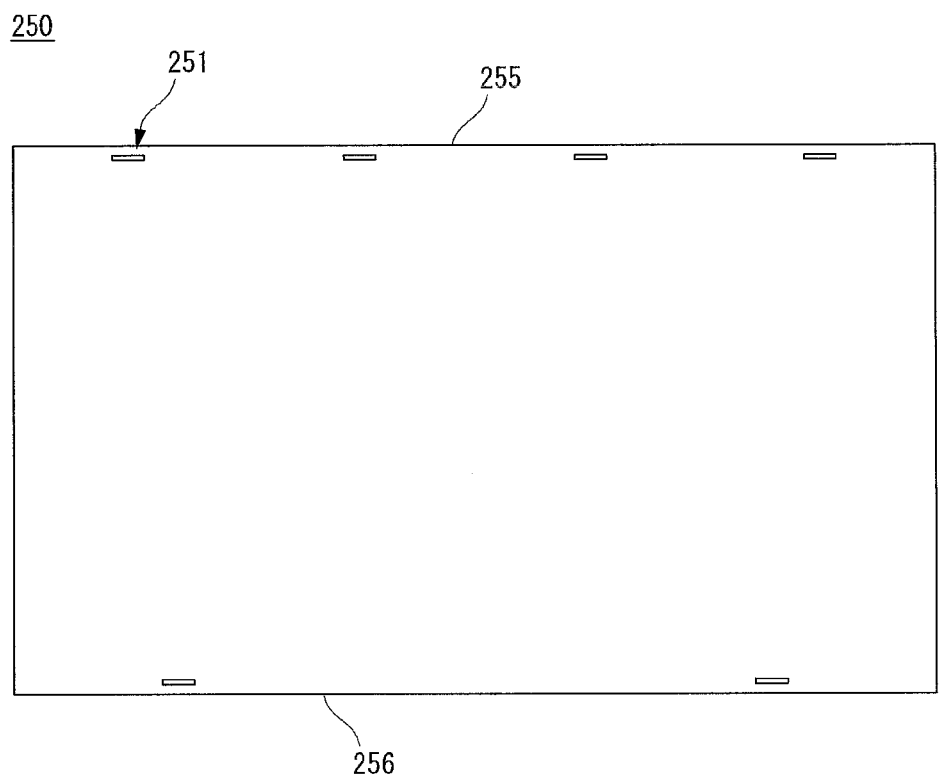

Referring now to FIG. 4G, the holes or slots 251 may be formed at an inner side of at least one side of the optical sheet 250, for example, at an inner side of the upper side 255 and the lower side 256 of the optical sheet 250. For example, the slots or holes 251 may be formed on the optical sheet 250 inside the side edges thereof. The plurality of holes 251 formed at an inner side of at least one side of the optical sheet 250 may be formed on the sides of the optical sheet 250 which face each other. For example, as shown in FIGS. 4G and 4I, the plurality of holes 251 may be positioned at the inner side of the upper side 255 and the lower side 256 of the optical sheet 250 which face each other. Further, the plurality of holes 251 may be positioned at the inner side of the left and right sides 257 and 258 of the optical sheet 250, and the plurality of holes 251 may be positioned at the inner side of the upper, lower, left, and right sides 255, 256, 257, and 258, respectively, of the optical sheet 250.

Further, with reference to FIG. 4G, the plurality of holes 251 formed at the inner side of the upper side 255 of the optical sheet 250 may be asymmetrical to the plurality of holes 251 formed at the inner side of the lower side 256 of the optical sheet 250 which faces the upper side 255. Also, with reference to FIG. 4I, the plurality of holes 251 formed at the inner side of the left side 257 of the optical sheet 250 may be symmetrical to the plurality of holes 251 formed at the inner side of the right side 256 of the optical sheet 250 which faces the left side 255.

Figure 4H:
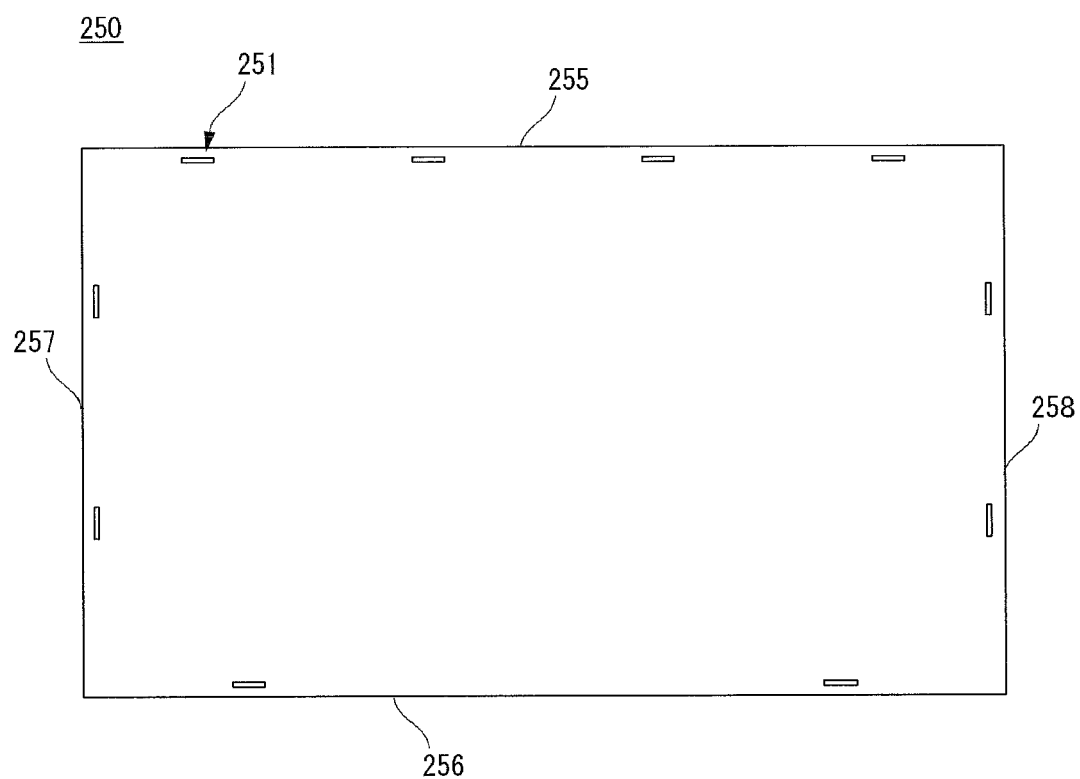
Figure 4I:
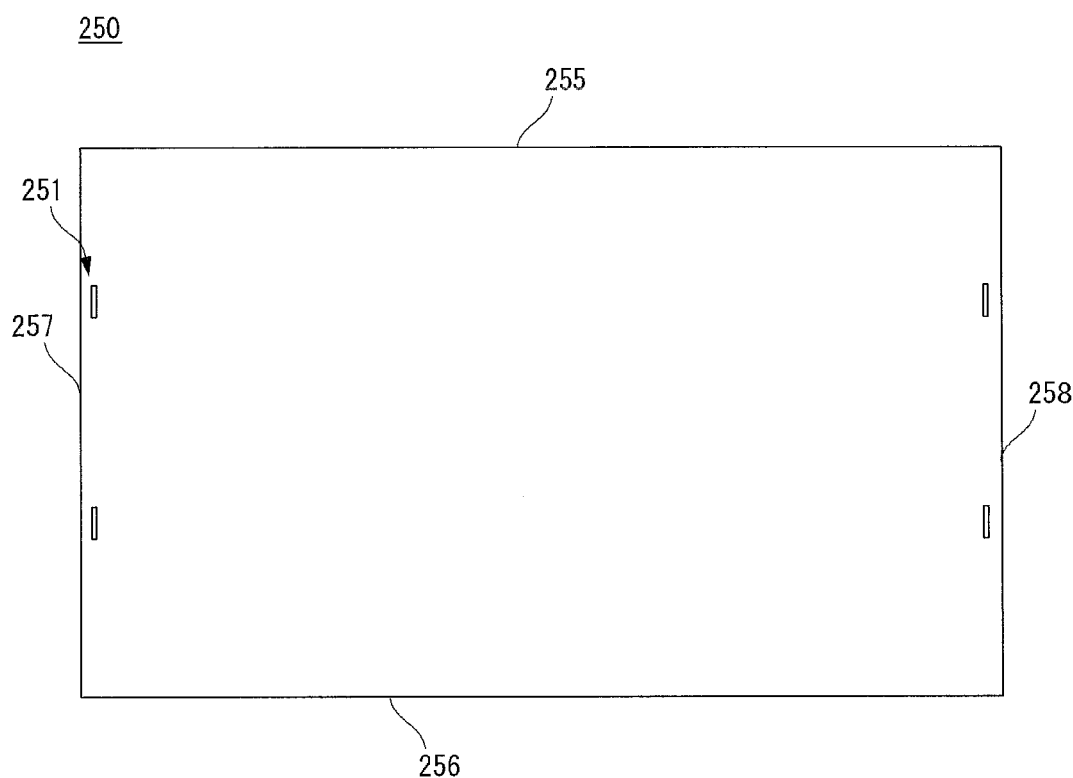

As shown in FIG. 4H, the plurality of holes 251 may be positioned at the inner side of all of the sides, for example, at the inner side of the upper, lower, left, and right sides 255, 256, 257, and 258 of the optical sheet 250. Also, as shown in FIG. 4I, the plurality of holes 251 may be positioned at the inner side of the sides, for example, at the inner side of the left and right sides 257 and 258 of the optical sheet 250 that face each other. Here, the plurality of holes 251 are not positioned at the upper and lower sides 255 and 256 of the optical sheet 250.

Figure 4J:
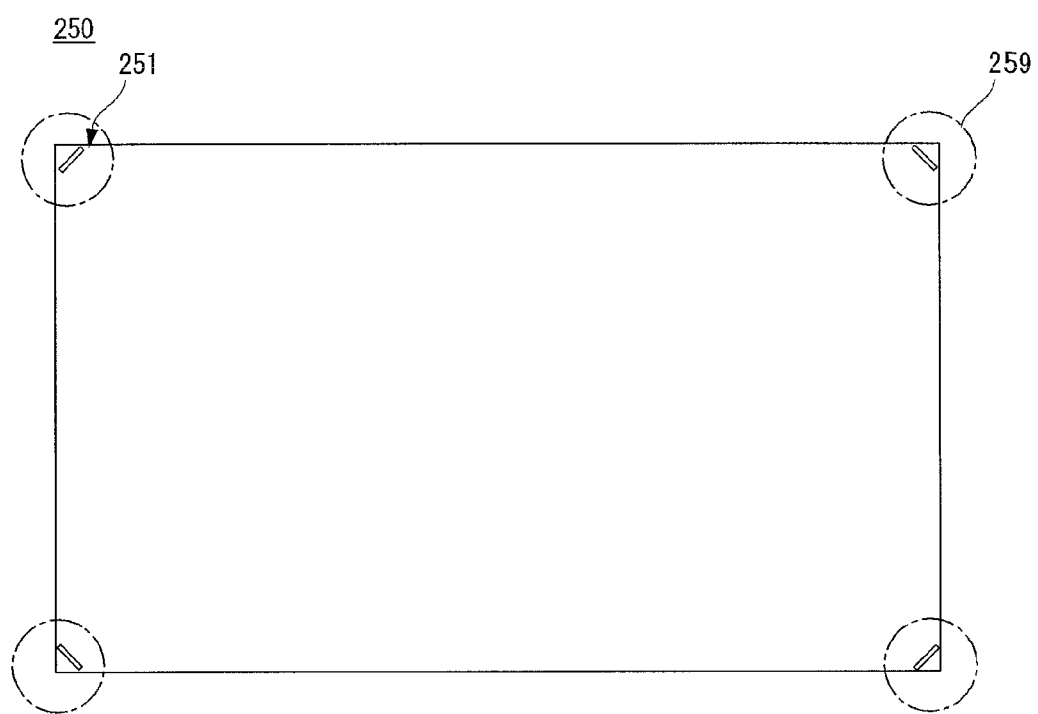
Figure 4K:
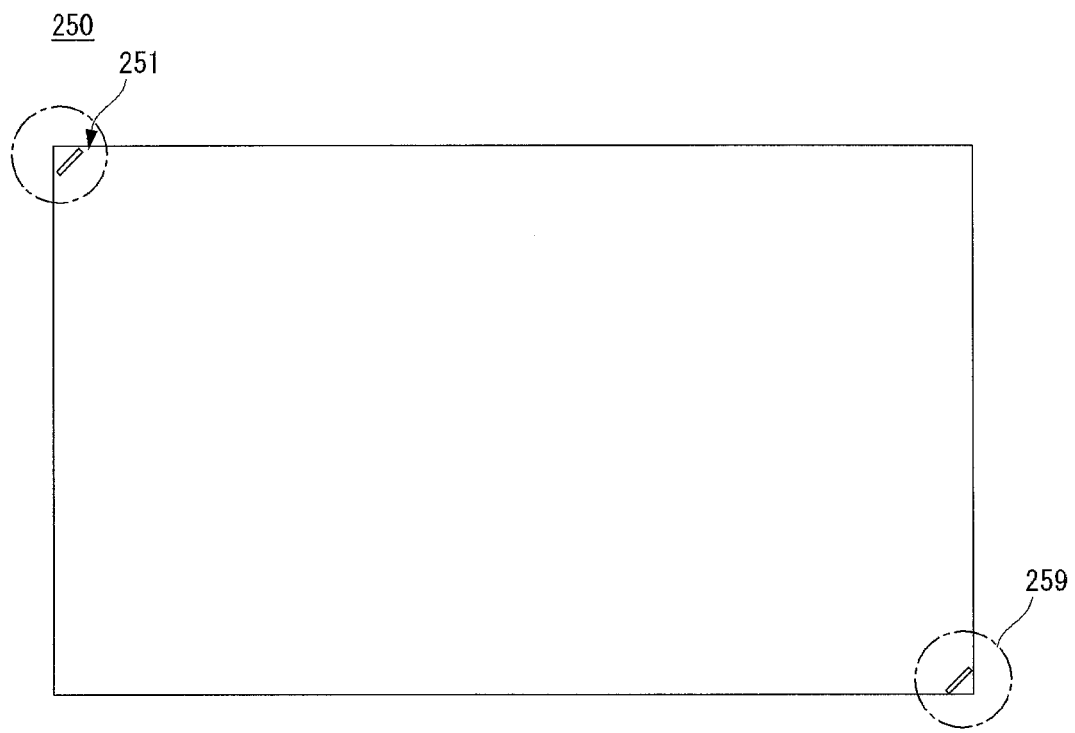

Referring now to FIG. 4J, the plurality of holes 251 may be positioned at the four corners 259 of the optical sheet 250. Alternatively, as shown in FIG. 4K, the plurality of holes 251 may be positioned at opposite corners 259 of the optical sheet 250 that face each other.

As described above, the optical sheet 250 according to the first embodiment may include the plurality of holes 251 on at least one side or at the corners thereof to fixedly couple the optical sheet 250 to the cover 130 or the housing 135. Thus, the reliability of the coupled optical sheet 250 and cover 130 or the housing 135 may be improved. Further, the optical characteristics of light emitted from the light sources may be effectively enhanced. The disposition of the holes of the optical sheet as illustrated in FIGS. 4A to 4K are not limited to this embodiment, and may be disposed, for example, only at one side of the optical sheet to couple with the cover or the housing.

Figure 5A:
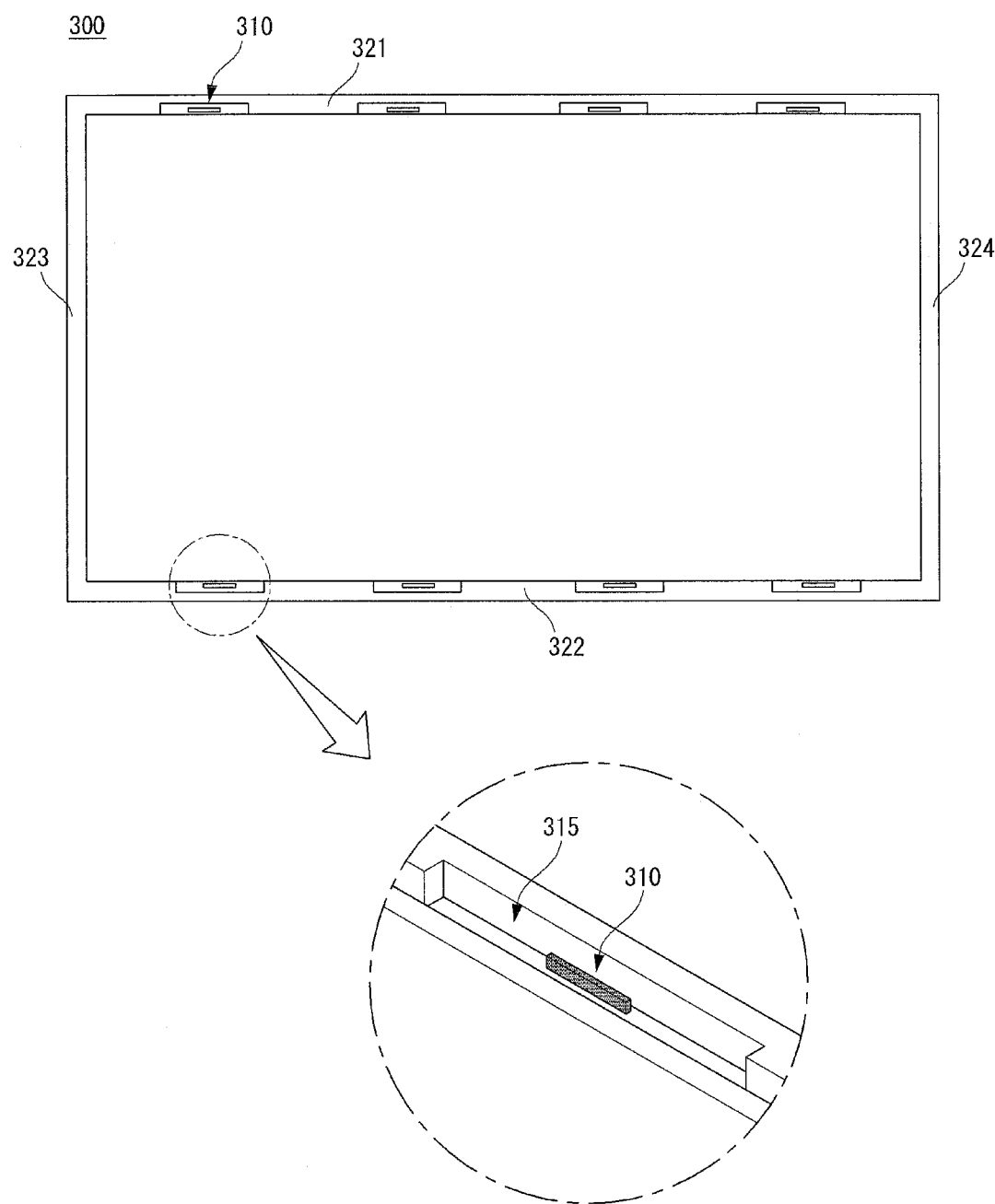
FIGS. 5A to 5C illustrate a housing and a fixing part according to the embodiment.
Figure 5B:
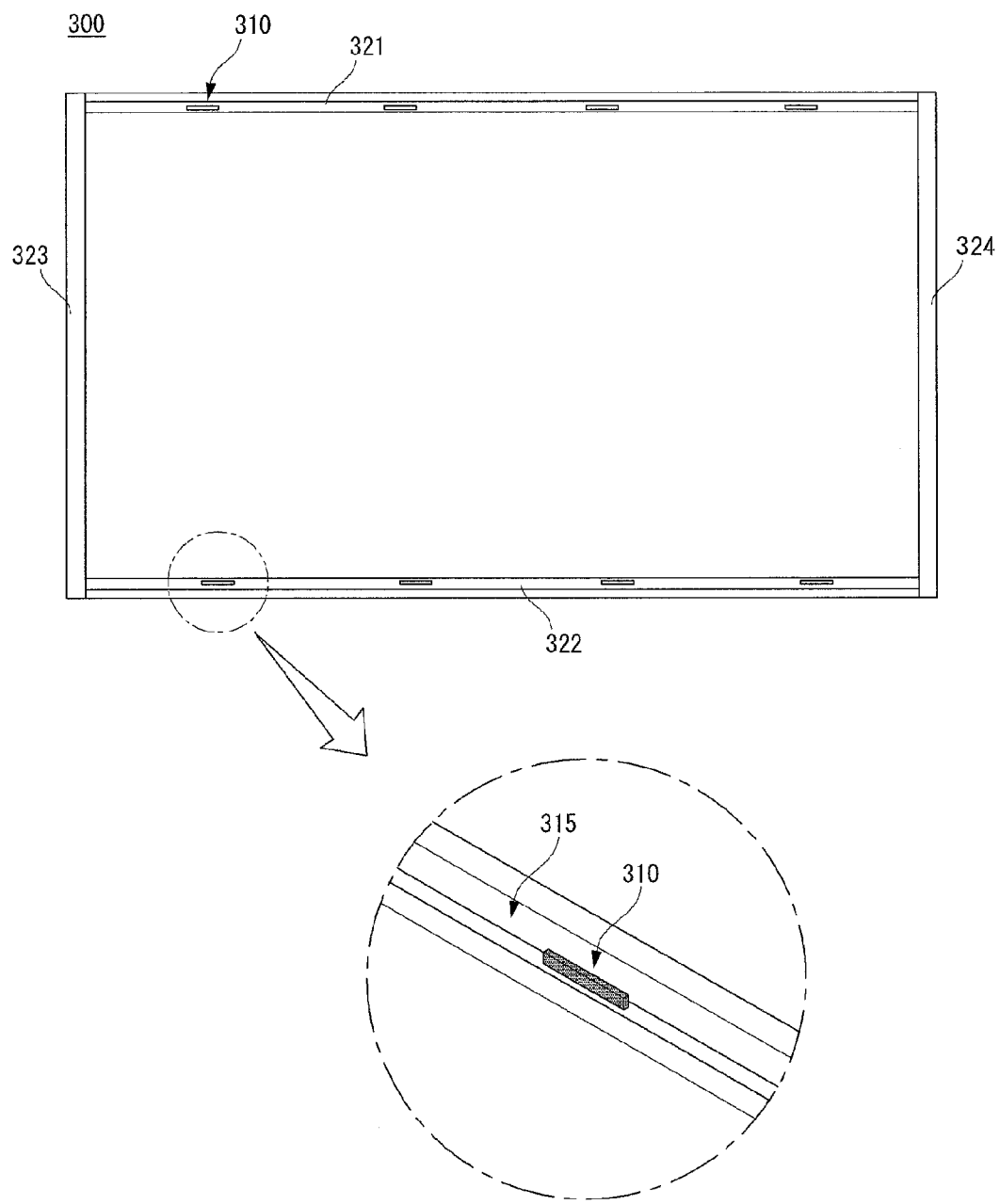
Figure 5C:
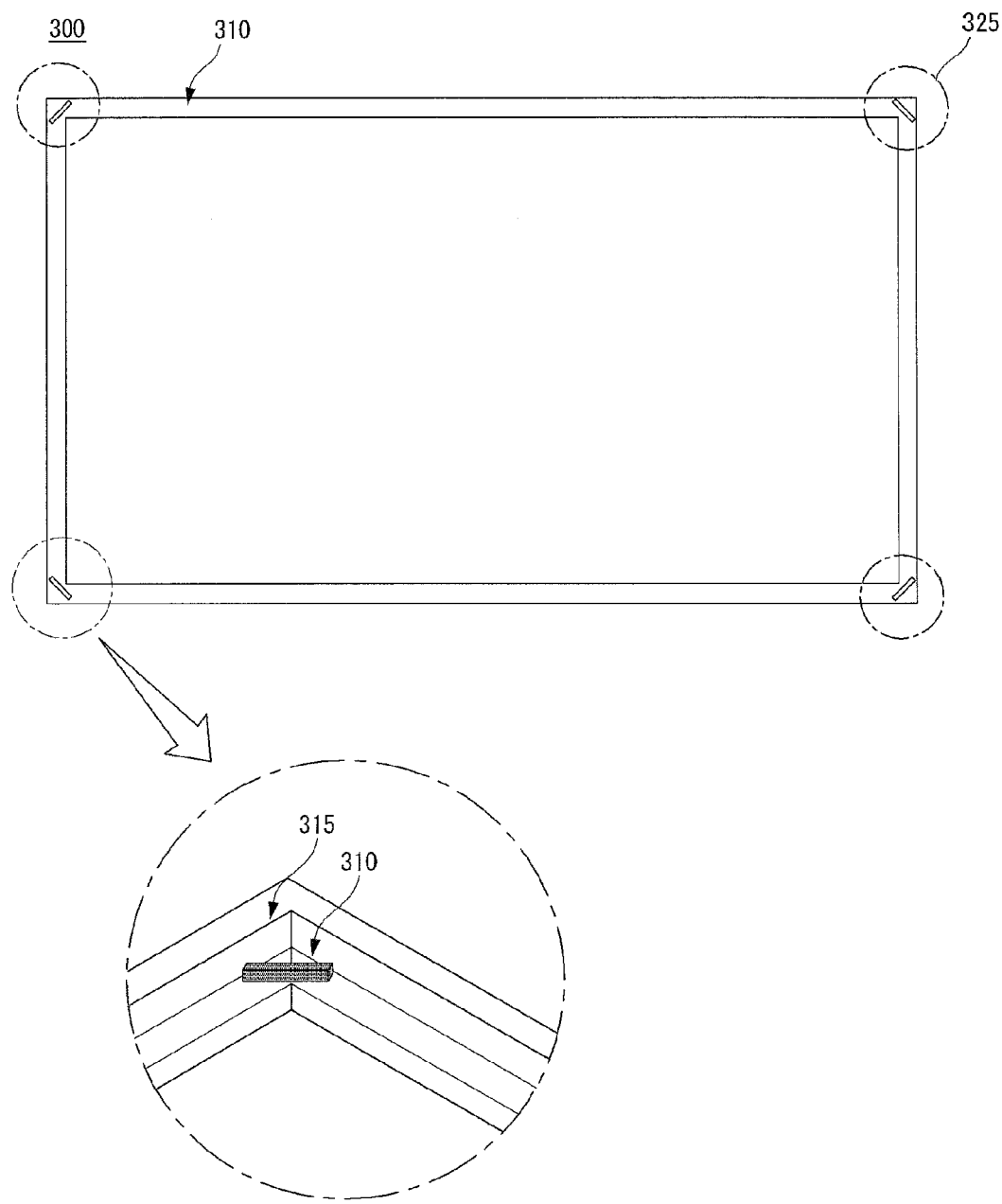

FIGS. 5A to 5C illustrate a cover and a fixing part according to this embodiment. Referring now to FIG. 5A, a cover 300 may have a shape of a rectangular frame and, as shown in FIG. 1, the cover 300 may cover the front side of the LCD 100. A fixing part 310 to couple the optical sheet 250 may be formed as a rail and may be positioned on a side wall of the cover 300. For example, a plurality of fixing parts 310 may be provided and positioned on at least one side wall of the cover 300. Further, as shown in FIG. 5A, the fixing parts 310 may be positioned on upper and lower side walls 321 and 322. The fixing parts 310 may be also positioned on left and right side walls 323 and 324 of the cover 300. The placement of the fixing parts 310 may correspond to the placement of the holes 251 of the optical sheet 250 as described above.

The fixing parts 310 may be formed on a step portion 315 of the side walls 323 and 324 of the cover 300 such that it may protrude upward from the side walls 323 and 324. The protrusion may have a hexahedral shape, cylindrical shape, spherical shape, or other appropriate shape and is not particularly limited thereto. Further, as described above the fixing part may also be formed as a rail. The step portion 315 may be a size sufficient to allow a hole 251 formed at a protrusion 252 of the optical sheet 250 to be mounted thereon. Further, the fixing part 310 may be positioned at a central portion of the step portion 315. The size of the fixing part 310 formed at the step portion 315 may be the same as that of the hole 251 formed on the protrusion 252, or may be slightly larger than that of the hole 251. Accordingly, the hole 251 of the optical sheet 250 may be coupled with the fixing part 310 of the cover 300 to fix the optical sheet 250 to the cover 300.

Referring to FIG. 5B, the step portions 315 may be formed along an entire lateral length of the side wall of the cover 300. The step portions 315 may be formed on the entire upper side wall 321 of the cover 300, and the step portions 315 may be formed on the entire lower side wall 322 of the cover 300.

The fixing parts 310 may be disposed on the step portions 315. The step portions 315 illustrated in FIG. 5B may allow mounting of the optical sheet illustrated in FIGS. 4G and 4I having the plurality of holes formed at the inner side of one side thereof. In this case, the plurality of holes formed on the optical sheets may be coupled to the fixing parts 310 formed at the step portions 315 of the cover 300.

As shown in FIG. 5C, the fixing parts 310 may be positioned at the corners 325 of the cover 300. Here, the fixing parts 310 may be disposed to be slanted, or diagonally, at the corners 325, but is not limited thereto. Thus, the optical sheet illustrated in FIGS. 4J and 4K as described above, for example, the optical sheet having the plurality of holes at the corners may be coupled to the fixing parts 310 positioned at the corners 325 of the cover 300.

Figure 6:
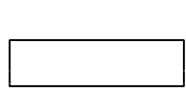
FIG. 6 illustrates shapes of a hole of the optical sheet and the fixing part of the housing.
Figure 6:
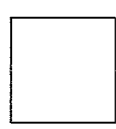
Figure 6:
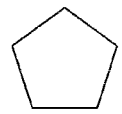
Figure 6:
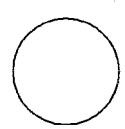
Figure 6:
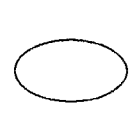

FIG. 6 illustrates the shapes of the hole of the optical sheet and the fixing part of the cover. The holes 251 of the optical sheet 250 and the fixing parts 310 of the cover 300 may have a quadrangular shape or any other appropriate shapes. The hole 251 of the optical sheet 250 or the fixing part 310 of the cover 300 may have a rectangular shape as shown in FIG. 6(a). Also, the hole 251 of the optical sheet 250 or the fixing part 310 of the cover 300 may have a square shape as shown in FIG. 6(b) or a pentagonal shape as shown in FIG. 6(c). However, the shapes are not limited thereto and the hole 251 of the optical sheet 250 or the fixing part 310 of the cover 300 may have any appropriate shapes including a polygonal shape having more sides than the pentagonal shape.

Also, the hole 251 of the optical sheet 250 or the fixing part 310 of the cover 300 may have a circular shape as shown in FIG. 6(d) or an oval shape as shown in FIG. 6(e). The shapes of the hole 251 of the optical sheet 250 or the fixing part 310 of the cover 300 are not limited thereto, and they may have any shape so long as it may allow for the coupling of the hole 251 of the optical sheet 250 and the fixing part 310 of the cover 300.

Hereinafter, the configuration in which the hole 251 of the optical sheet 250 and the fixing part 310 of the cover 300 are coupled will now be described in detail. Simply for ease of explanation, the hole 251 of the optical sheet 250 and the fixing part 310 of the cover 300 will be described with reference to a hole having a rectangular shape.

Figure 7:
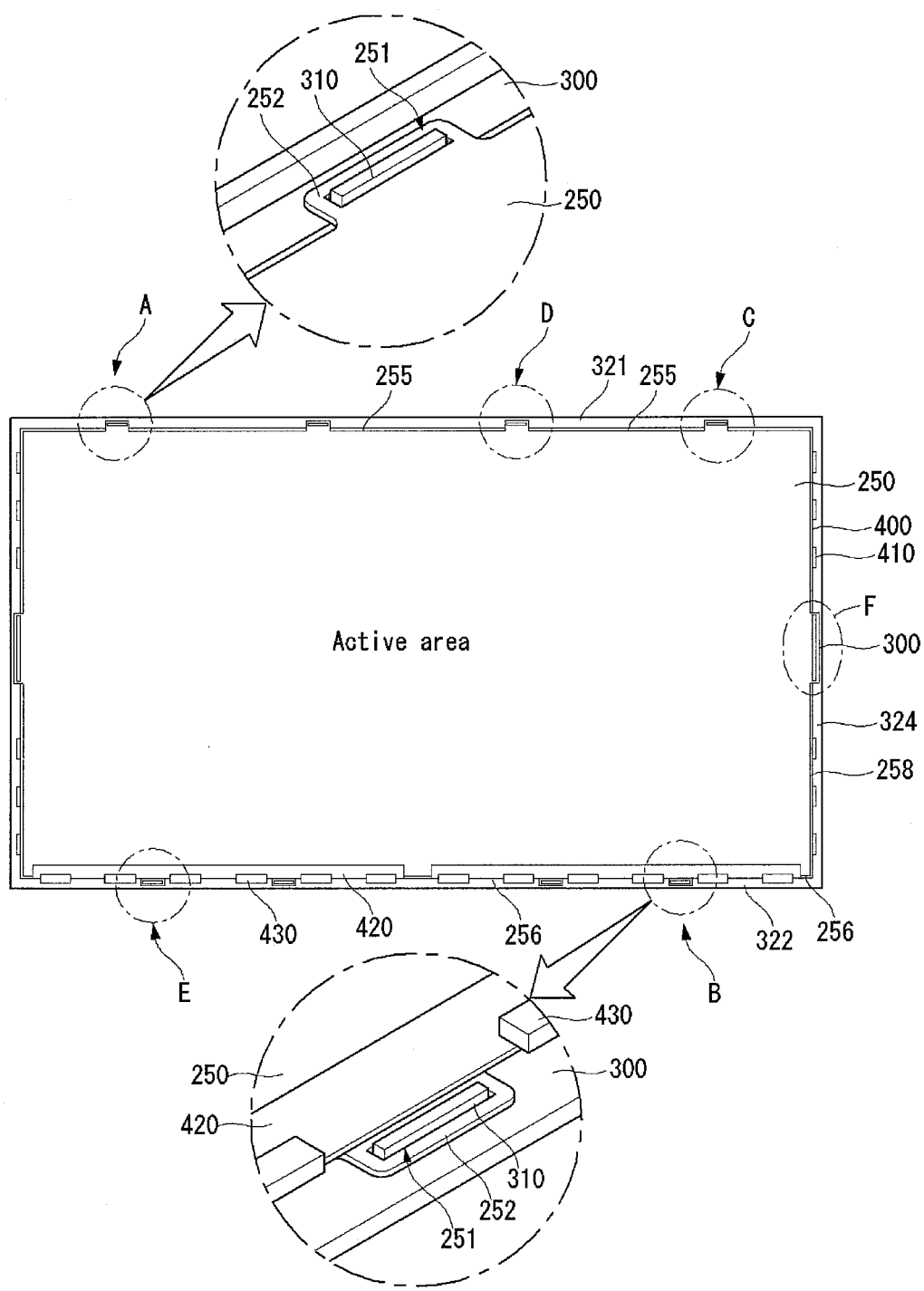
FIG. 7 illustrates a liquid crystal display panel and the optical sheet coupled with the housing according to the embodiment.
Figure 8A:
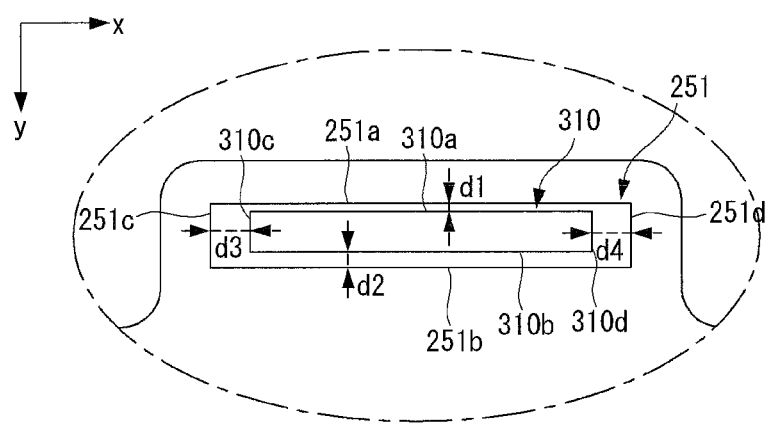
FIGS. 8A and 8D are enlarged views of a portion 'C' in FIG. 7.
Figure 8B:
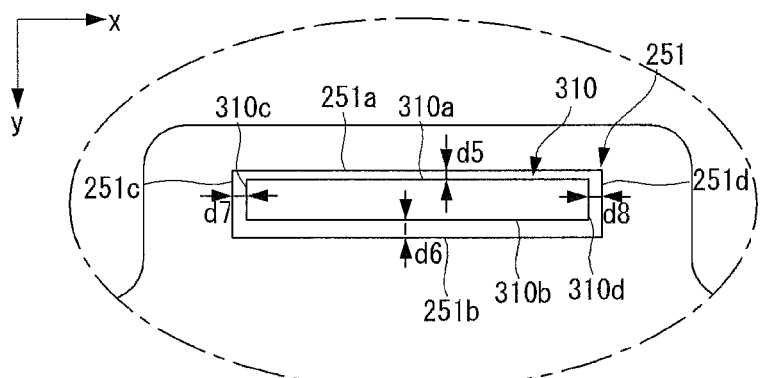
FIGS. 8B and 8E are enlarged views of a portion 'D' in FIG. 7.
Figure 8C:
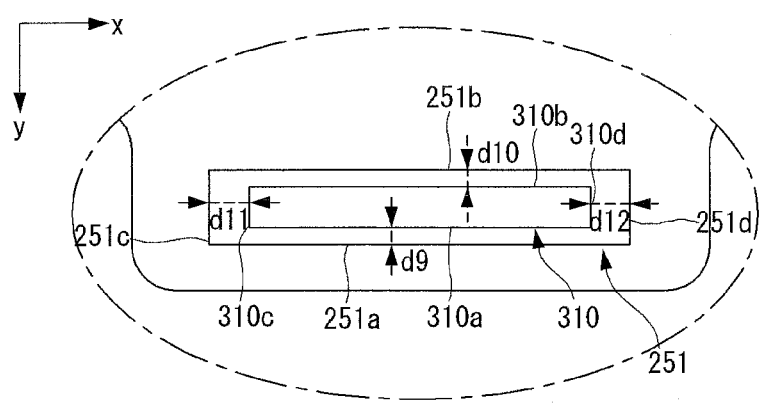
FIGS. 8C and 8G are enlarged views of a portion 'E' in FIG. 7
Figure 8D:
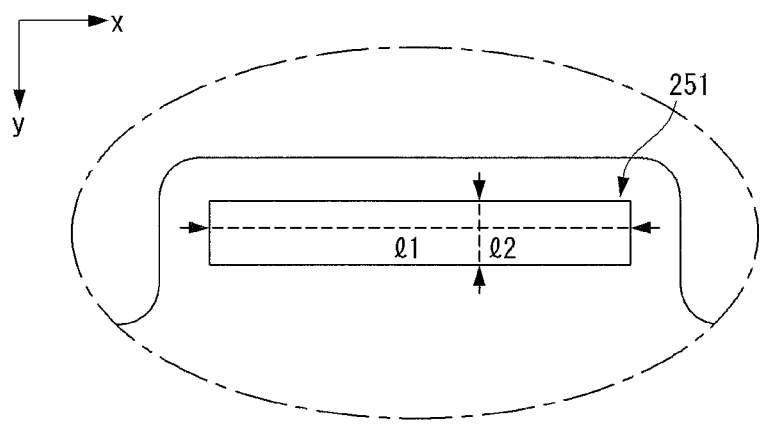

FIG. 7 illustrates the liquid crystal display panel and the optical sheet coupled to the cover according to an embodiment; FIGS. 8A and 8D are an enlarged view of a portion 'C' in FIG. 7; FIGS. 8B and 8D are an enlarged view of a portion 'D' in FIG. 7; FIGS. 8C and 8F are an enlarged view of a portion 'E' in FIG. 7; and FIG. 8G is an enlarged view of a portion 'F' in FIG. 7.

As shown in FIG. 7, a liquid crystal display panel 400 may be positioned on the cover 300, and the optical sheet 250 may be positioned on the liquid crystal display panel 400. A plurality of gate driving circuits 410 may be disposed at left and right sides of the liquid crystal display panel 400, and a printed circuit board (PCB) 420 may be disposed on the optical sheet 250 on the liquid crystal display panel 400. A plurality of data driving circuits 430 may be disposed on the PCB 420.

Here, the optical sheet 250 may be disposed on the cover 300 such that the holes 251 of the optical sheet 250 may be coupled with the fixing parts 310 of the cover 300. For example, referring to enlarged portion 'A' in FIG. 7, the slot or hole 251 that may be formed at the tab or protrusion 252 and disposed at the upper side of the optical sheet 310 may be coupled with the rail or fixing part 310 formed at the upper side wall of the cover 300. For example, the fixing part 310 may be inserted into the hole 251 of the optical sheet 250.

Referring to a portion 'B' in FIG. 7, the hole 251 that may be formed at the protrusion 252 and disposed at the lower side of the optical sheet 310 may be coupled with the fixing part 310 formed at the lower side wall of the cover 300. Here, the protrusions 252 of the optical sheet 250 and the fixing parts 310 of the cover 300 may be disposed between the data driving circuits 430 of the liquid crystal display panel 400.

For example, in order to secure an area at the side of the cover 300 where the data driving circuits 430 may be mounted, the fixing parts 310 may be disposed between the data driving circuits 430, and the protrusions 252 and the holes 251 of the optical sheet 250 may be disposed between the data driving circuits 430 according to the disposition of the fixing parts 310.

Referring to FIG. 8A, enlarged portion 'C' shows the hole 251 that may be coupled to the fixing part 310 at the edge on the upper side of the optical sheet 250. Here, the hole 251 may include a first side 251a, a second side 251b, a third side 251c, and a fourth side 251d, and the fixing part 310 may include a fifth side 310a facing the first side 251a of the hole 251, a sixth side 310b facing the second side 251b, a seventh side 310c facing the third side 251c, and an eighth side 310d facing the fourth side 251d. Here, the first side 251a of the hole 251 may be adjacent to the cover 300, and the second side 251b may be separated to be positioned away from the cover 300.

For example, in the enlarged portion 'C' where the hole 251 may be coupled to the fixing part 310 at the edge on the upper side of the optical sheet 250, a first distance d1 may be formed between the first side 251a of the hole 251 and the fifth side 310a of the fixing part 310, a second distance d2 may be formed between the second side 251b of the hole 251 and the sixth side 310b of the fixing part 310, a third distance d3 may be formed between the third side 251c of the hole 251 and the seventh side 310c of the fixing part 310, and a fourth distance d4 may be formed between the fourth side 251d of the hole 251 and the eighth side 310d of the fixing part 310.

The first distance d1 may range from 0.05 mm to 0.3 mm, and may preferably be 0.1 mm. Here, when the first distance d1 is longer than 0.05 mm, a sufficient margin may be provided to allow for an expansion of the optical sheet 250 due to heat generated in the LCD. Thus, a crease in the optical sheet 250 due to thermal expansion may advantageously be prevented. When the first distance d1 is shorter than 0.3 mm, tension may be caused on the optical sheet 250 by the fixing part 310 when the optical sheet 250 contracts as heat dissipates from the optical sheet 250. Thus, a crease in the optical sheet 250 due to thermal contraction may advantageously be prevented.

The second distance d2 may range from 0.1 mm to 1 mm, and may preferably be 0.5 mm. Here, when the second distance d2 is longer than 0.1 mm, a sufficient margin may be provided to allow for an expansion of the optical sheet 250 due to heat generated in the LCD. Thus, a crease in the optical sheet 250 due to thermal expansion may advantageously be prevented. When the second distance d2 is shorter than 1 mm, the second distance d2 between the fixing part 310 and the hole 251 may increase as the optical sheet 250 contracts as heat dissipates from the optical sheet 250, thus advantageously preventing the hole 251 from being released from the fixing part 310. For example, a length of the slot or hole 251 may be 0.15 mm to 1.3 mm larger than a length of the rail or fixing part 310.

The third distance d3 and the fourth distance d4 may range from 1 mm to 5 mm, and may preferably be 2 mm. Here, when the third distance d3 and the fourth distance d4 are longer than 1 mm, a sufficient margin may be provided to allow for an expansion of the optical sheet 250 due to heat generated in the LCD, thus a crease in the optical sheet 250 may advantageously be prevented. When the third distance d3 and the fourth distance d4 are shorter than 5 mm, the third distance d3 and the fourth distance d4 between the fixing part 310 and the hole 251 may increase, thus advantageously preventing the hole 251 and the fixing part 310 from being released. For example, a width of the slot or hole 251 may be 2 mm to 10 mm larger than a width of the rail or fixing part 310.

Referring to FIG. 8B, enlarged portion 'D' shows the hole 251 that may be coupled to fixing part 310 at the center among the holes 251 disposed on the upper side of the optical sheet 250. Here, a fifth distance d5 may be formed between the first side 251a of the hole 251 and the fifth side 310a of the fixing part 310, a sixth distance d6 may be formed between the second side 251b of the hole 251 and the sixth side 310b of the fixing part 310, a seventh distance d7 may be formed between the third side 251c of the hole 251 and the seventh side 310c of the fixing part 310, and an eighth distance d8 may be formed between the fourth side 251d of the hole 251 and the eighth side 310d of the fixing part 310.

The fifth distance d5 may range from 0.05 mm to 0.3 mm, and may preferably be 0.1 mm. Here, when the fifth distance d5 is longer than 0.05 mm, a sufficient margin may be provided to allow for an expansion of the optical sheet 250 due to heat generated in the LCD. Thus, ceasing of the optical sheet 250 may be prevented. When the fifth distance d5 is shorter than 0.3 mm, tension may be created on the optical sheet 250 by the fixing part 310 as the optical sheet 250 contracts due to dissipation of heat, thus advantageously preventing the optical sheet 250 from being creased.

The sixth distance d6 may range from 0.1 mm to 1 mm, and may preferably be 0.5 mm. Here, when the sixth distance d6 is longer than 0.1 mm, a margin sufficient for thermal expansion of the optical sheet 250 may be provided, thus advantageously preventing the optical sheet 250 from being creased. When the sixth distance d6 is shorter than 1 mm, the sixth distance d6 between the fixing part 310 and the hole 251 may increase as the optical sheet 250 contracts as heat is dissipated, thus advantageously preventing the hole 251 from being released from the fixing part 310. For example, the length of hole 251 may be 0.15 mm to 1.3 mm larger than a length of the rail or fixing part 310.

The seventh distance d7 and the eighth distance d8 may range from 0.1 mm to 1 mm, and may preferably be 0.5 mm. Here, when the seventh distance d7 and the eighth distance d8 are longer than 0.1 mm, a sufficient margin may be provided to allow for an expansion of the optical sheet 250 due to heat generated in the LCD, thus a crease in the optical sheet 250 may advantageously be prevented. When the seventh distance d7 and the eighth distance d8 are shorter than 1 mm, the hole 251 and the fixing part 310 may serve to fix the optical sheet 250 at the central portion of the optical sheet 250, thus advantageously preventing the optical sheet 250 from being distorted at its position. For example, a width of the slot or hole 251 may be 0.15 mm to 1.3 mm larger than a width of the rail or fixing part 310.

As discussed above with reference to FIGS. 8A and 8B, the seventh distance d7 and the eighth distance d8 between the hole 251 and the fixing part 310 disposed at enlarged portion 'D' positioned near a central portion of optical sheet 250 may be shorter than the third distance d3 and the fourth distance d4 between the hole 251 and the fixing part 310 disposed at enlarged portion 'C'.

As for the relationship between the hole 251 and the fixing part 310 disposed at the central portion 'D' of the optical sheet 250, they may be positioned near a central portion of the optical sheet 250 and may serve to fix the overall position of the optical sheet 250 as stated above. Accordingly, the optical sheet 250 may be fixed to prevent its position from changing due to an expansion or contraction of the optical sheet 250.

Also, as for the relationship between the hole 251 and the fixing part 310 disposed at enlarged portion 'C' of the optical sheet 250, they may be positioned at the edge of the optical sheet 250 to secure a margin sufficient to allow for the extraction and contraction of the optical sheet 250. Thus, the third distance d3 and the fourth distance d4 may be larger than the corresponding distances at the central position 'D'.

Referring to FIG. 8C, an enlarged portion 'E' shows the hole 251 that may be disposed at the lower side of the optical sheet 250 coupled to the fixing part 310. Here, a ninth distance d9 may be formed between the first side 251a of the hole 251 and the fifth side 310a of the fixing part 310, a tenth distance d10 may be formed between the second side 251b of the hole 251 and the sixth side 310b of the fixing part 310, an eleventh distance d11 may be formed between the third side 251c of the hole 251 and the seventh side 310c of the fixing part 310, and a twelfth distance d12 may be formed between the fourth side 251d of the hole 251 and the eighth side 310d of the fixing part 310.

The ninth distance d9 may range from 0.1 mm to 1 mm, and may preferably be 0.5 mm. Here, when the ninth distance d9 is longer than 0.1 mm, a margin sufficient to allow for thermal expansion of the optical sheet 250 may be provided, thus advantageously preventing the optical sheet 250 from being creased. When the ninth distance d9 is shorter than 1 mm, tension may be provided to the optical sheet 250 by the fixing part 310 when the optical sheet 250 contracts as heat dissipates from the optical sheet 250, thus advantageously preventing the optical sheet 250 from being creased.

The tenth distance d10 may range from 0.1 mm to 1 mm, and may preferably be 0.5 mm. Here, when the tenth distance d10 is longer than 0.1 mm, a margin sufficient to allow for thermal expansion of the optical sheet 250 may be provided, thus advantageously preventing the optical sheet 250 from being creased. When the tenth distance d10 is shorter than 1 mm, the tenth distance d10 between the fixing part 310 and the hole 251 may increase as the optical sheet 250 contracts as heat dissipates from the optical sheet 250, thus advantageously preventing the hole 251 from being released from the fixing part 310. For example, a length of slot or hole 251 may be 0.2 mm to 2 mm larger than a length of rail or fixing part 310.

The eleventh distance d11 and the twelfth distance d12 may range from 1 mm to 5 mm, and may preferably be 2 mm. Here, when the eleventh distance d11 and the twelfth distance d12 are longer than 1 mm, a margin sufficient to allow for thermal expansion of the optical sheet 250 may be provided, thus advantageously preventing the optical sheet 250 from being creased. When the eleventh distance d11 and the twelfth distance d12 are shorter than 5 mm, the eleventh distance d11 and the twelfth distance d12 between the fixing part 310 and the hole 251 may be lengthened, thus advantageously preventing the hole 251 and the fixing part 310 from being released. For example, a width of slot or hole 251 may be 2 mm to 5 mm larger than a width of rail or fixing part 310.

Moreover, the range of distances for d1 and d5 as described above are applicable when the LCD 100 is positioned horizontally. However, when the LCD is positioned vertically, for example, when mounted on a stand or on a wall for use, as enlarged portions 'C' and 'D' are positioned at the upper side 255 of the optical sheet 250, distances d1 and d5 will become zero. Further, in the vertical position, distances d2, d6, d10, and d9 will adjust accordingly.

Meanwhile, with reference to FIG. 7, the one or more holes 251 of the optical sheet 250 may be formed to correspond to the periphery of an active area of the display panel 400. The active area of the display panel 400 may be an area on which an image is displayed, and the periphery of the active area of the display panel 400 may be an area between an outer edge of the active area of the display panel 400 and the cover 300. Here, the area between the outer edge of the active area and the cover 300 may refer to an area extending from the outer edge of the active area to the cover 300. For example, the area may include the cover 300. The holes 251 of the optical sheet 250 may be positioned between the display panel 400 and the cover 300, and may be fixedly coupled with the fixing parts 310 of the cover 300.

The holes 215 provided on the optical sheet 250 according to this embodiment may be positioned on the upper side 255 and the lower side 256 of the optical sheet 250, and the size of the holes 251 positioned on the upper side 255 of the optical sheet 250 may be different from that of the holes 251 positioned on the lower side 256 of the optical sheet 250. For example, the size of the holes 251 positioned on the upper side 255 of the optical sheet 250 may be smaller than the size of the holes 251 positioned on the lower side 256 of the optical sheet 250.

Figure 8E:
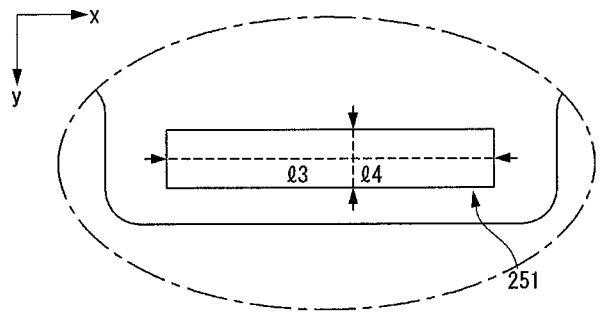
Figure 8F:
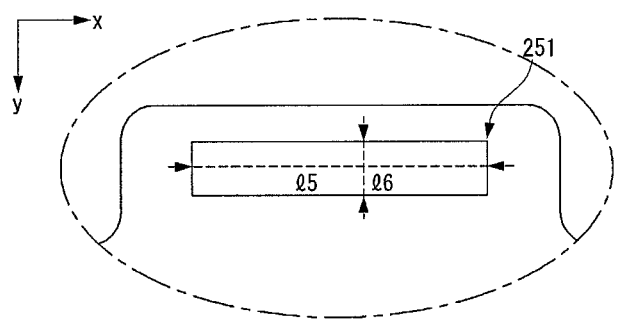
FIG. 8F is an enlarged view of a portion 'F' in FIG. 7.
Figure 8G:
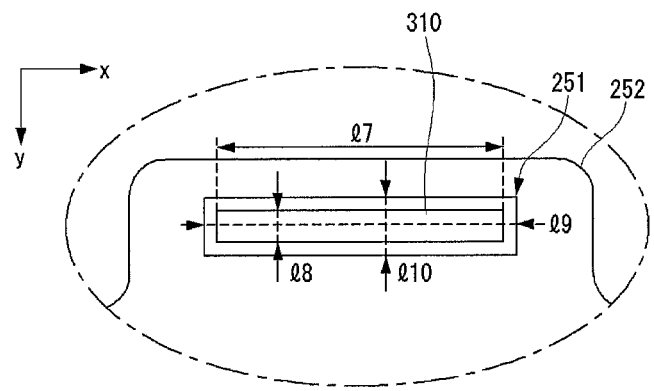

FIG. 8D illustrates the hole 251 of the optical sheet 250 at a portion 'D' in FIG. 7, FIG. 8E illustrates the hole 251 of the optical sheet 250 at a portion 'E' in FIG. 7, and FIG. 8F illustrates the hole 251 of the optical sheet 250 at a portion 'C' in FIG. 7. With reference to FIGS. 8D and 8E, the length of a longer axis l1 and a shorter axis l2 of the hole 251 positioned on the upper side 255 of the optical sheet 250 illustrated in FIG. 8D may be shorter than the length of a longer axis l3 and a shorter axis l4 positioned on the lower side 256 of the optical sheet 250 illustrated in FIG. 8E. Here, the longer axis of the hole 251 may be the longest axis in an x-axis direction of the hole 251, and the shorter axis of the hole 251 may be the shortest axis in a y-axis direction of the hole 251.

For example, the size of the hole 251 positioned on the upper side 255 of the optical sheet 250 may be smaller than the size of the hole 251 positioned on the lower side 256 of the optical sheet 250. Thus, as aforementioned, the hole 251 positioned on the upper side 255 of the optical sheet 250 may act as a reference point for fixing the optical sheet 250 to the cover 300 to prevent the optical sheet 250 from being deformed, for example, by heat, which may cause it to shift or move from its original position. Further, the hole 251 positioned on the lower side 256 of the optical sheet 250 may serve to provide a margin for thermal expansion when the optical sheet 250 is deformed by heat.

With reference to FIGS. 8D and 8F, the length of the longer axis l1 of the hole 251 positioned at a central portion of the upper side 255 of the optical sheet 250 illustrated in FIG. 8D may be shorter than the length of the longer axis l5 of the hole 251 positioned at the edge of the upper side 255 of the upper side 255 of the optical sheet 250 illustrated in FIG. 8F. Also, the length of the shorter axis l2 of the hole 251 positioned at the central portion of the upper side 255 of the optical sheet 250 may be equal to the length of the shorter axis l6 of the hole 251 positioned at the edge of the upper side 255 of the optical sheet 250.

For example, the size of the hole 251 positioned at the central portion of the upper side 255 of the optical sheet 250 may be smaller than that of the hole 251 positioned at the edge of the upper side 255 of the optical sheet 250. Thus, as previously discussed, the hole 251 positioned at the central portion of the upper side 255 of the optical sheet 250 may act as a reference point for fixing the optical sheet 250 to the cover 300 to prevent the optical sheet 250 from being deformed, shifted, or moved due to thermal expansion, while the hole 251 positioned at the edge of the upper side 255 of the optical sheet 250 may serve to provide a margin for thermal expansion when the optical sheet 250 is deformed by heat.

In the foregoing description, simply for ease of explanation, the fixing parts 310 have been described as being provided on the cover 300 and shaped as a rail. However, the present invention is not limited thereto. For example, the fixing parts 310 may be provided on the bottom plate of the housing and may be formed in any appropriate shape as previously described.

Figure 9A:
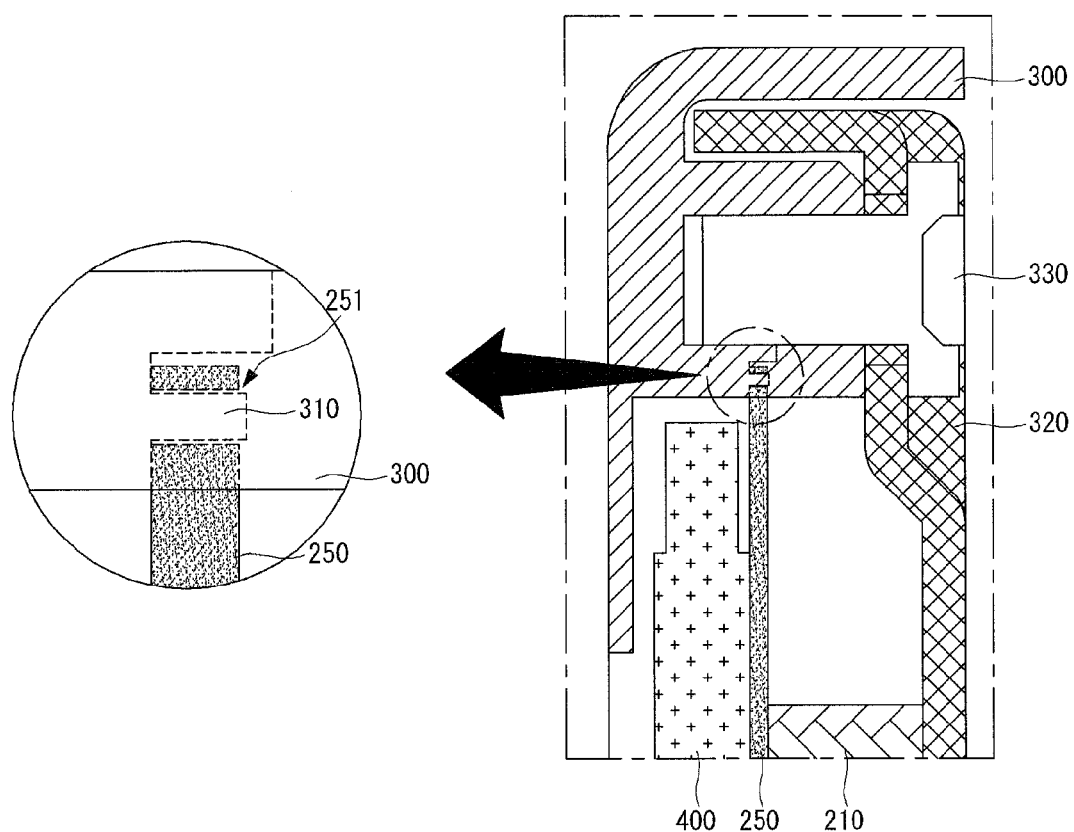
FIGS. 9A and 9B are sectional views of the LCD according to the embodiment.
Figure 9B:
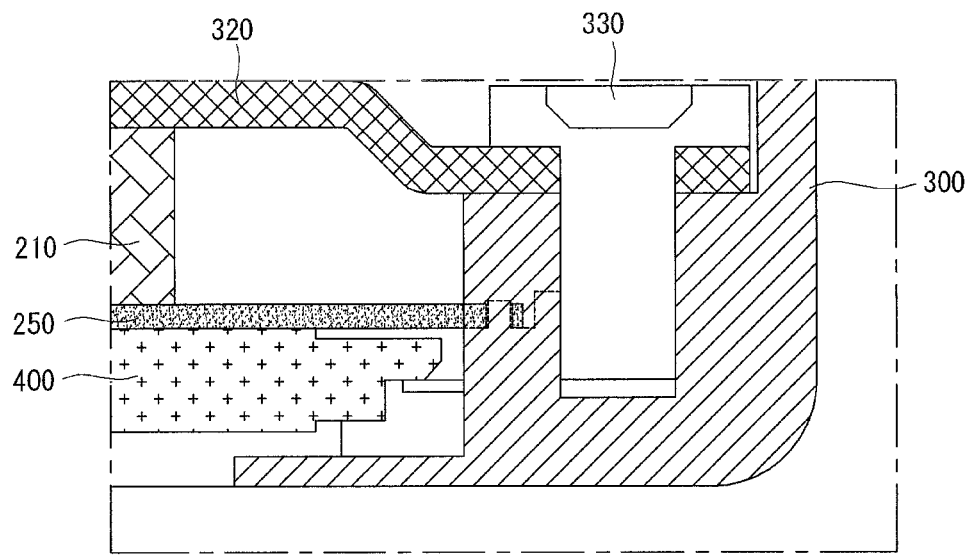

FIGS. 9A and 9B are sectional views of the LCD according to the first embodiment. Specifically, FIG. 9A is a vertical sectional view of the upper side of the cover perpendicular to a lengthwise direction, and FIG. 9B is a vertical sectional view of the lateral side of the cover perpendicular to the lengthwise direction. As shown in FIGS. 9A and 9B, the LCD 100 may be configured such that a liquid crystal display panel 400 is disposed on a front cover 300 and the optical sheet 250 is disposed on the liquid crystal display panel 400. The optical sheet 250 may be fixedly coupled with the cover 300. For example, the optical sheet 250 may be fixedly coupled with the cover 300 such that the hole 251 of the optical sheet 250 may be coupled with the fixing part 310 provided at the side wall of the cover 300.

The optical assembly 210 may disposed on the optical sheet 250, and the cover 300 and a bottom plate 320 may be coupled by means of a screw 330. Here, as shown in FIG. 9A, at the upper side of the cover 300, a side portion of the bottom plate 320 may be inserted into a side portion of the cover 300. Meanwhile, as shown in FIG. 9B, at the lateral side of the cover 300, the bottom plate 320 may be mounted on the cover 300 and coupled by means of a screw 330.

As described above, in the LCD 100, the liquid crystal display panel 400, the optical sheet 250, and the optical assembly 210 may be received in the cover 300 and the bottom plate 320, and the hole 251 of the optical sheet 250 may be fixedly coupled to the fixing part 310 of the cover 300. Thus, the optical sheet 250 may be prevented from being deformed as it thermally contacts or expands due to heat generated from the light sources of the optical assembly 210. Therefore, light uniformity of the backlight unit may be improved.

Figure 10:
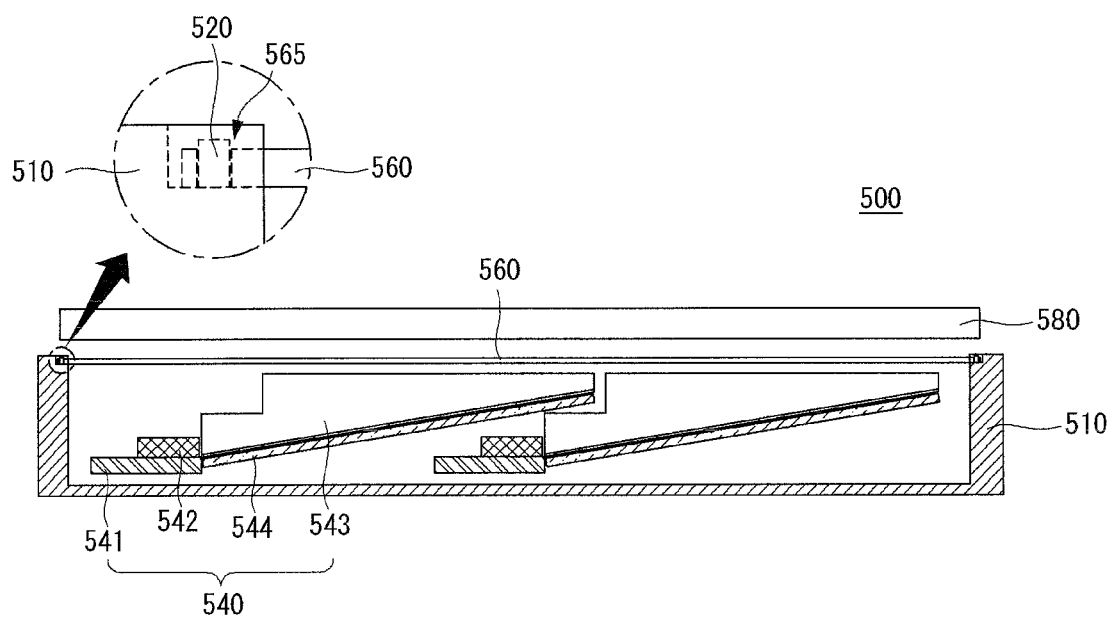
FIGS. 10 and 11 illustrate a backlight unit and an optical assembly according to another embodiment.
Figure 11:
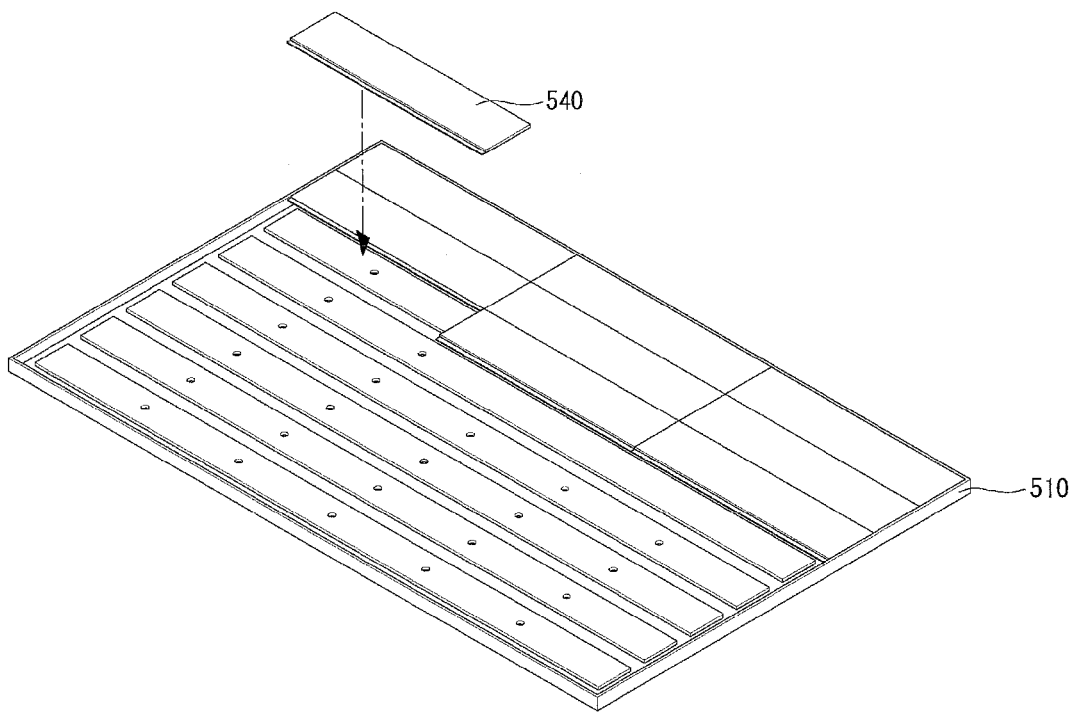

FIGS. 10 and 11 illustrate a backlight unit including light source assemblies according to a second embodiment. As shown in FIG. 10, an LCD 500 according to this embodiment may include a bottom plate 510, an optical assembly 540, an optical sheet 560, and a liquid crystal display panel 580. The bottom plate 510 may receive the optical assembly 540 and the optical sheet 560 therein. The bottom plate 510 may also be a rear cover.

The optical assembly 540 received in the bottom plate 510 may include a first layer 541, light sources 542, light guide plates 543, and a reflective plate 544. The first layer 541 may be a board (or substrate) on which a plurality of light sources 542 may be mounted. An electrode pattern may be formed on the first layer 541 to connect an adapter that may supply power and the light sources 542. The first layer 541 may be a PCB formed of polyethylene terephthalate (PET), glass, polycarbonate (PC), silicon (Si), or other appropriate materials, on which the plurality of light sources 542 may be mounted. The first layer 541 may be formed as a film.

The light sources 542 may be one of a light emitting diode (LED) chip and an LED package including at least one LED chip. In this embodiment, simply for ease of explanation, the light sources 542 will be described as being an LED package. The LED package constituting the light sources 542 may be classified into a top view type LED package and a side view type LED package depending on the direction of a light emission surface. The light sources 542 may be configured by using at least one of the top view type LED package in which a light emission surface may be formed toward the upper side and the side view type LED package in which the light emission surface may be formed toward the side.

The light guide plates 543 may be disposed in a direction in which light may be emitted from the light sources 542 and may serve to widely spread light formed incident from the light sources 542. In this embodiment, the light guide plate 543 may be configured such that a side contiguous with the light source 542 may include a step that may allow a neighboring light guide plate 543 to be mounted thereon. A lower surface of the light guide plate 543 may be formed to slope, or positioned at an angle, to upwardly reflect light received from the light source 542. The reflective plate 544 may be disposed on the lower surface of the light guide plate 543 and may serve to upwardly reflect light which may be reflected downward from the light guide plate 543.

The optical assembly 540 including the first layer 541, the light sources 542, the light guide plates 543, and the reflective plate 544 may implement light in an edge manner. A plurality of light source assemblies 540 may be provided in the LCD 500. With reference to FIG. 11, the foregoing light source assemblies 540 may be coupled in a recess formed on the cover member 510. The light source assemblies 540 may be coupled to the entire lower surface of the bottom plate 510. Thus, because the light source assemblies 540 that implement light in an edge manner are formed on the entire lower surface of the bottom plate 510, they may function as a backlight unit that provides light in a direct manner.

As shown in FIG. 10, the optical sheet 560 may be positioned on the plurality of light source assemblies 540 formed on the lower surface of the bottom plate 510. The optical sheet 560 may be a diffusion sheet that diffuses light or a prism sheet that concentrates light. Further, a plurality of optical sheets may be formed.

The optical sheet 560 may be mounted on the plurality of light source assemblies 540 and may be coupled to the fixing part 520 formed on the side wall of the bottom plate 510. Here, as shown in FIGS. 4A to 4K according to the first embodiment, the optical sheet 560 may include a plurality of holes 565. Also, as shown in FIGS. 5A to 5C according to the first embodiment as described above, the bottom plate 510 may include a plurality of fixing parts 520.

Accordingly, as the holes 565 of the optical sheet 560 may be coupled to the fixing parts 520 formed on the side wall of the bottom plate 510, the optical sheet 560 may be fixed to the bottom plate 510. Thus, the optical sheet 560 may be prevented from being deformed as it contracts or expands due to heat generated from the light sources 542 of the optical assembly 540. Therefore, light uniformity of the backlight unit may be improved.

Figure 12:
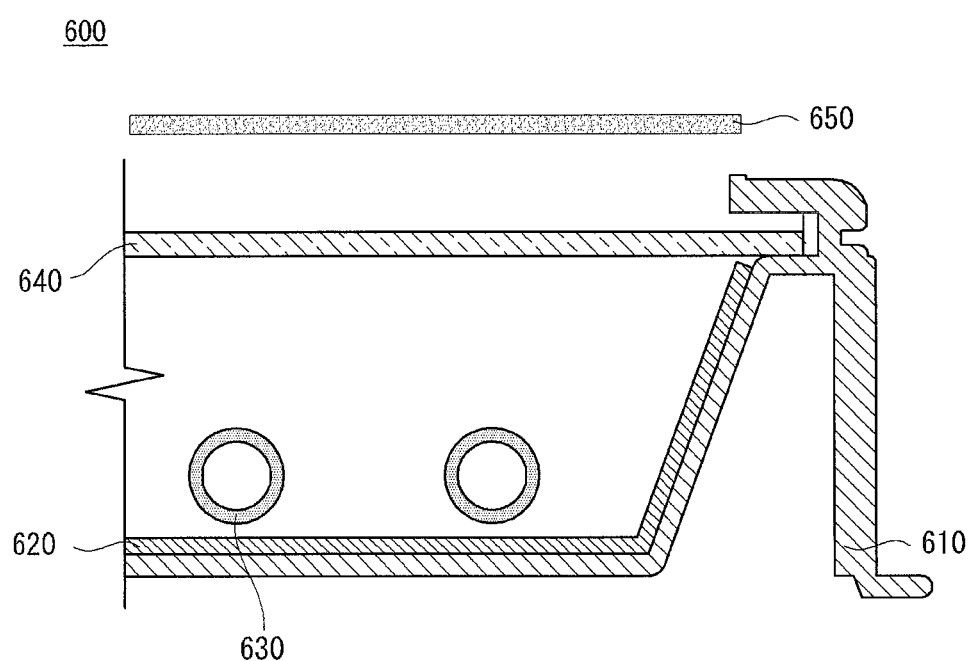
FIG. 12 illustrates a direct type backlight unit.

FIG. 12 illustrates a direct type backlight unit. Referring to FIG. 12, a backlight unit 600 may include a bottom plate 610, a reflective plate 620, light sources 630, a diffusion plate 650, and an optical sheet 650. The reflective plate 620 may be positioned on the entire inner surface of the bottom plate 610 and may serve to reflect light emitted from the light sources 630 upwards. The light sources 630 may be a CCFL (cold cathode fluorescent lamp), an HCFL (hot cathode fluorescent lamp), an EEFL (extended electrode fluorescent lamp), or other appropriate light source. A plurality of light sources may be positioned to be separated at predescribed intervals. The diffusion plate 640 may serve to diffuse linear light emitted from the light sources 630 and may change it into surface-type light. The optical sheet 650 may be positioned at an upper side of the diffusion plate 640.

The direct type backlight unit 600 as illustrated in FIG. 12 may use a plurality of lamps having a large diameter as light sources, and may cause increase in the thickness of the space within the bottom plate 610 in which the light sources 630 are disposed. This may result in an increase in the thickness of the backlight unit 600. Accordingly, because there may be a relatively large space between the light sources 630 and the optical sheet 650, heat generated by the light sources 630 may be prevented from being transferred to the optical sheet 650. Thus, the optical sheet 650 may be protected from being deformed by the heat by the light sources 630.

Meanwhile, the backlight units according to the first and second embodiments may be configured to have the light source assemblies including very small LED light sources. For example, in the backlight unit according to the first embodiment as shown in FIG. 3, the second layer 230 may be positioned to cover the light sources 217, the diffusion plate 240 may be formed contiguously on the second layer 230, and the optical sheet 250 may be positioned on the diffusion plate 240. Further, in the backlight unit according to the second embodiment as shown in FIG. 10, the light sources 542 and the light guide plates 543 may be formed, and then the optical sheet 560 may be disposed on the light guide plates 543.

For example, the backlight units according to the first and second embodiments may have a relatively thin structure as they may use very small LED light sources. Thus, the space between the LED light sources and the optical sheet may be very narrow. Heat discharged from the light sources, therefore, may be directly transferred to the optical sheet. In particular, in case of the backlight unit according to the first embodiment, there may not be sufficient space for releasing heat that is generated by the LED light sources. This may result in deformation of the optical sheet formed of a resin material as it contracts or expands due to the heat generated by the light sources.

Thus, in order to overcome this problem, in the first and second embodiments, the plurality of holes may be formed on the optical sheet and coupled to the plurality of fixing parts that may be formed on the bottom plate. Accordingly, a margin, allowing for thermal expansion of the optical sheet due to heat generated by the light sources, may be created between the holes and the fixing parts, thereby preventing possible creases in the optical sheet. Also, as the optical sheet contracts, the fixing parts may serve to apply tension to the optical sheet to prevent the optical sheet from contracting. Thus, deformation of the optical sheet may be prevented.

Figure 13:
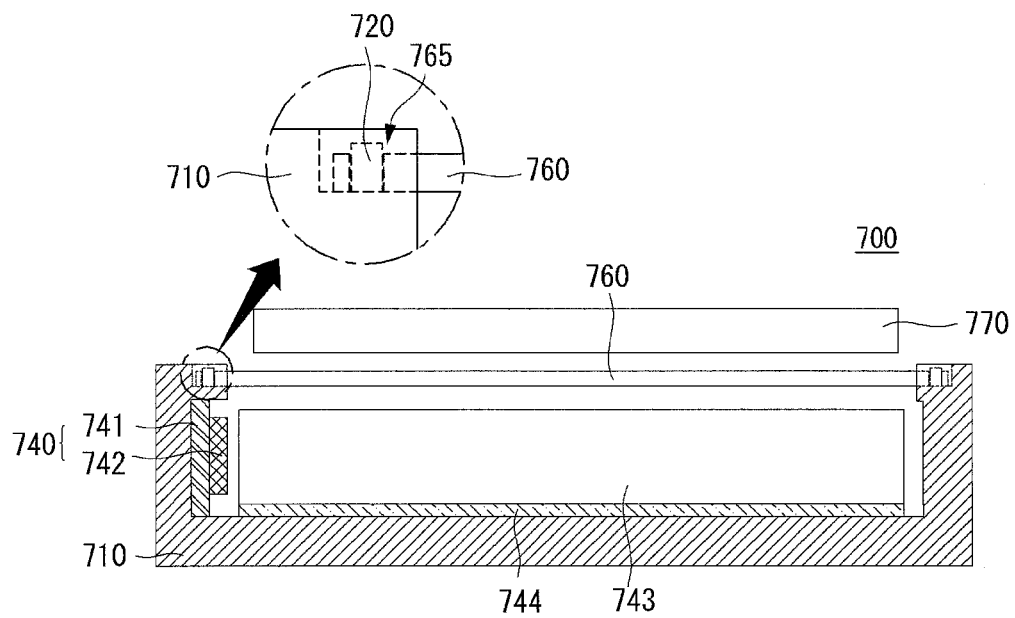
FIG. 13 illustrates an LCD according to another embodiment.

FIG. 13 illustrates an LCD according to a third exemplary embodiment of the invention. As shown in FIG. 13, an LCD 700 according to the third embodiment may include a bottom plate 710, an optical assembly 740, an optical sheet 760, and a liquid crystal display panel 780. The bottom plate 710 may receive the optical assembly 740 and the optical sheet 760 therein. The bottom plate 710 may be a rear cover member.

The optical assembly 740 received in the bottom plate 710 may include a first layer 741 and the light sources 742. The first layer 741 may be a board (or substrate) on which a plurality of light sources 742 may be mounted. An electrode pattern may be formed on the first layer 741 in order to connect an adapter that may supply power and the light sources 542. The first layer 741 may be a PCB formed of polyethylene terephthalate (PET), glass, polycarbonate (PC), silicon (Si), or other appropriate materials on which the plurality of light sources 742 may be mounted. The first layer 741 may be formed as a film.

The light sources 742 may be one of a light emitting diode (LED) chip and an LED package including at least one LED chip. In this embodiment, simply for ease of explanation, the light sources 742 will be described as being an LED package. The LED package constituting the light sources 742 may be classified into a top view type LED package and a side view type LED package depending on the direction of a light emission surface. The light sources 742 according to this embodiment may be configured by using at least one of the top view type LED package in which a light emission surface may be formed toward the upper side and the side view type LED package in which the light emission surface may be formed toward the lateral side.

A light guide plate 743 may be disposed in a direction in which light may be emitted from the light sources 742 and may serve to widely spread light formed incident from the light sources 742. A reflective plate 744 may be disposed at a lower portion of the light guide plate 743 to reflect upwards light which may be reflected downward from the light guide plate 743. The optical assembly 740 including the first layer 741 and the light sources 742 may be positioned on the side of the bottom plate 710 as a backlight unit implementing light in an edge manner.

The optical sheet 760 may be positioned on the light guide plate 743. The optical sheet 760 may be a diffusion sheet that may diffuse light or a prism sheet that may concentrate light. A plurality of optical sheets may be formed. The optical sheet 760 may be mounted on the light guide plate 760 and may be coupled to the fixing part 720 formed on the side wall of the bottom plate 710. Here, as shown in FIGS. 4A to 4K according to the first embodiment as described above, the optical sheet 760 may include a plurality of holes 765. Also, as shown in FIGS. 5A to 5C according to the first embodiment as described above, the bottom plate 710 may include a plurality of fixing parts 720. Accordingly, as the holes 765 of the optical sheet 760 may be coupled to the fixing parts 720 formed on the side wall of the bottom plate 710, the optical sheet 760 may be fixed to the bottom plate 710. Thus, deformation of the optical sheet 760 may be prevented as it contracts or expands due to heat generated from the light sources 742 of the optical assembly 740. Accordingly, light uniformity of the backlight unit may be improved.

Figure 14:
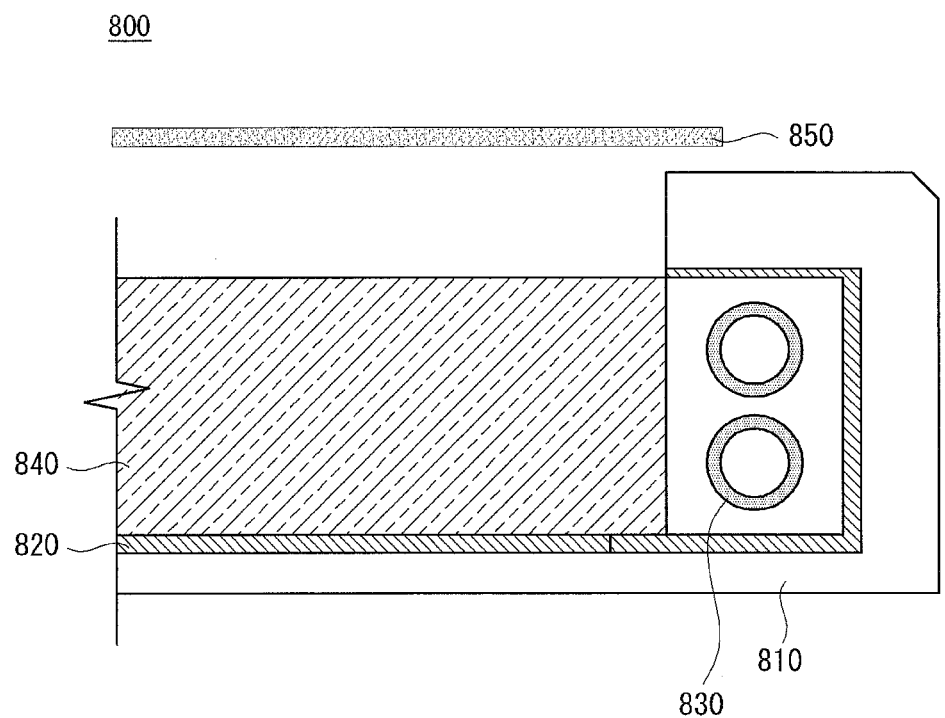
FIG. 14 illustrates an edge type backlight unit.

FIG. 14 illustrates an edge type backlight unit. Referring to FIG. 14, a backlight unit 800 may include a bottom plate 810, a reflective plate 820, light sources 830, a light guide plate 840, and an optical sheet 850. The reflective plate 820 may be positioned on an entire inner surface of the bottom plate 810 to serve to reflect upwards light emitted from the light sources 830. The light sources 830 may be a CCFL (cold cathode fluorescent lamp), an HCFL (hot cathode fluorescent lamp), an EEFL (extended electrode fluorescent lamp), or other appropriate light sources. The light sources 830 may be disposed at one side of the bottom plate 810.

The light guide plate 840 may be positioned on the side portion of the light sources 830 and on the entire surface of the bottom plate 810. The light guide plate 840 may also serve to reflect light emitted from the light sources 830 to change it into a surface-type light. The optical sheet 850 may be positioned at an upper side of the light guide plate 840.

The edge type backlight unit 800 illustrated in FIG. 14 may use a plurality of lamps as light sources having a large diameter increasing the relative thickness of the space within the bottom plate 810 in which the light sources 830 are disposed. This may result in an increase in the overall thickness of the backlight unit 800. Accordingly, because there may be relatively large space between the light sources 830 and the optical sheet 850, heat generated by the light sources 830 may be prevented from being transferred to the optical sheet 850. The optical sheet 850 may thus be protected from being deformed by the heat generated by the light sources 830.

Meanwhile, the backlight unit according to the third embodiment may be configured to have the light source assemblies including very small LED light sources. For example, the backlight unit according to the third exemplary embodiment of the invention may have a relatively thin structure in which the very small LED light sources may be used. Thus, the space between the LED light sources and the optical sheet may be very narrow. Accordingly, heat discharged from the light sources may be directly transferred to the optical sheet.

Also, in order to emit light with an equal luminance as that of the fluorescent lamp light sources, a large amount of current may be required by the LED light sources. In this case, as the applied current increases the amount of heat generated by the LED may also increase. Then, the optical sheets that are formed of a resin material may be deformed and may contract or expand due to heat emitted from the light sources.

Thus, in the edge type backlight unit according to the third embodiment, a plurality of holes may be formed at the optical sheet and a plurality of fixing parts may be formed at the bottom plate, wherein the holes of the optical sheet and the fixing parts of the bottom plate may be coupled to each other. Accordingly, a margin allowing for thermal expansion of the optical sheet due to heat generated by the light sources may be created between the holes and the fixing parts, thereby preventing possible creases in the optical sheet. Also, as the optical sheet contracts, the fixing parts may serve to apply tension to the optical sheet to prevent the optical sheet from contracting. Thus, deformation of the optical sheet may be prevented.

A display device is broadly described and embodied herein and may include a display panel having a plurality of electrodes and pixels; a backlight provided adjacent to the display panel, the backlight unit including at least one light guide panel having at least one light incident area to receive light from a first direction and a light emitting area to emit light received through the light incident area in a second direction, the first and second directions being different directions; at least one light source, at least one incident area of the light guide panel being adjacent to at least one light source to receive light output; and a reflector adjacent to the light guide panel to reflect light towards the second direction; and at least one optical sheet provided between the display panel and the backlight, the at least one optical sheet including a first optical sheet; and a cover provided adjacent to the display panel or the backlight, wherein the cover includes a first rail near a first side of the cover and a second rail near a second side of the cover, the first and second sides being opposite sides, the first optical sheet has a first slot near a first side and a second slot near a second side, the first and second sides being opposite sides of the first optical sheet, and the first slot is fitted over the first rail and the second slot is fitted over the second rail.

The display device is disclosed wherein the first slot is smaller than the second slot; wherein the first and second rails have the same size; wherein when the display device is positioned to be vertical such that the second direction is perpendicular to a direction of gravity, the first slot of the first optical sheet hangs onto the first rail, and the second slot is provided loosely over the second slot.

The display device is disclosed wherein the first optical sheet includes a plurality of tab portions, a first tab portion extending from the first side of the optical sheet and the first slot being provided on the first tab portion, and a second tab portion extending from the second side of the optical sheet and the second slot being provided on the second tab portion; wherein the backlight is provided within a first area of the cover, and at least a portion of the first tab portion and the second tab portion are provided outside of the first area; and wherein the at least one light guide panel is provided within a first are of the cover, and the at least a portion of the first tab portion and the second tab portion are provided outside of the first area; wherein the at least one light guide panel is provided within a first area of the cover, and the at least a portion of the first tab portion and the second tab portion are provided outside of the first area.

Here, as shown in FIGS. 7 and 8G, display device is disclosed wherein the cover 300 further includes a third rail near a third side 324, which is between the first 321 and second sides 322, and the first optical sheet 250 further includes a third slot near the third side 258, which is between the first 255 and second sides 256 of the first optical sheet, the third slot being fitted over the third rail, and the third slot being bigger than the first slot; and wherein the first optical sheet includes a plurality of tab portions, a first tab portion extending from the first side of the optical sheet and the first slot being provided on the first tab portion, a second tab portion extending from the second side of the optical sheet and the second slot being provided on the second tab portion, and a third tab portion 252 extending from the third side 258 of the optical sheet 250 and the third slot 251 being provided on the third tab portion 252.

The display device is disclosed wherein the third rail 310 has a first width l8 and a first length l7 and the third slot 251 has a first width l10 and a first length l9, the first width l10 of the third slot being larger than the first width l8 of the third rail by 2 mm to 10 mm, and the first length l9 of the third slot being larger than the first length l7 of the third rail by 0.15 mm to 1.3 mm; wherein the first rail has a first width and a first length and the first slot has a first width and a first length, the first width of the first slot being larger than the first width of the first rail by 0.2 mm to 2 mm, and the first length of the first slot being larger than the first length of the first rail by 0.15 mm to 1.3 mm; and wherein the second rail has a first width and a first length and the second slot has a first width and a first length, the first width of the second slot being larger than the first width of the second rail by 2 mm to 10 mm, and the first length of the second slot being larger than the first length of the second rail by 0.2 mm to 2 mm.

A display device comprises a display panel having a plurality of electrodes and pixels; a backlight provided adjacent to the display panel; at least one optical sheet provided between the display panel and the backlight, the at least one optical sheet including a first optical sheet; and a cover provided adjacent to the display panel or the backlight, wherein the cover includes a first rail near a first side of the cover and a second rail near a second side of the cover, the first and second sides being opposite sides, the first optical sheet has a first slot near a first side and a second slot near a second side, the first and second sides being opposite sides of the first optical sheet, the first slot is fitted over the first rail and the second slot is fitted over the second rail, and the first slot is smaller than the second slot.

The display device is disclosed wherein the first and second rails have the same size; wherein the first optical sheet includes a plurality of tab portions, a first tab portion extending from the first side of the optical sheet and the first slot being provided on the first tab portion, and a second tab portion extending from the second side of the optical sheet and the second slot being provided on the second tab portion; wherein the backlight is provided within a first area of the cover, and at least a portion of the first tab portion and the second tab portion are provided outside of the first area; and wherein the at least one light guide panel is provided within a first area of the cover, and the at least a portion of the first tab portion and the second tab portion are provided outside of the first area.

The display device is disclosed wherein the first rail has a first width and a first length and the first slot has a first width and a first length, the first width of the first slot being larger than the first width of the first rail by 0.2 mm to 2 mm, and the first length of the first slot being larger than the first length of the first rail by 0.15 mm to 1.3 mm; and wherein the second rail has a first width and a first length and the second slot has a first width and a first length, the first width of the second slot being larger than the first width of the second rail by 2 mm to 10 mm, and the first length of the second slot being larger than the first length of the second rail by 0.2 mm to 2 mm.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel having a plurality of electrodes and pixels;
a backlight provided adjacent to the display panel, the backlight unit including at least one light guide panel having at least one light incident area to receive light from a first direction and a light emitting area to emit light received through the light incident area in a second direction, the first and second directions being different directions;
at least one light source, at least one incident area of the light guide panel being adjacent to at least one light source to receive light output;
a reflector adjacent to the light guide panel to reflect light towards the second direction; and
at least one optical sheet provided between the display panel and the backlight, the at least one optical sheet including a first optical sheet; and
a cover provided adjacent to the display panel or the backlight, wherein the cover includes a first rail near a first side of the cover and a second rail near a second side of the cover, the first and second sides being opposite sides, the first optical sheet has a first slot near a first side and a second slot near a second side, the first and second sides being opposite sides of the first optical sheet, and the first slot is fitted over the first rail and the second slot is fitted over the second rail,
wherein the cover further includes a third rail near a third side, which is between the first and second sides, and the first optical sheet further includes a third slot near third side, which is between the first and second sides of the first optical sheet, the third slot being fitted over the third rail,
wherein the first side and the second side of the optical sheet are longer than the third side of the optical sheet, and
wherein the first slot is smaller than the second slot and the third slot.

2. The display device of claim 1, wherein the first and second rails have the same size.

3. The display device of claim 1, wherein when the display device is positioned to be vertical such that the second direction is perpendicular to a direction of gravity, the first slot of the first optical sheet hangs onto the first rail, and the second slot is provided loosely over the second rail.

4. The display device of claim 1, wherein the first optical sheet includes a plurality of tab portions, a first tab portion extending from the first side of the optical sheet and the first slot being provided on the first tab portion, and a second tab portion extending from the second side of the optical sheet and the second slot being provided on the second tab portion.

5. The display device of claim 4, wherein the backlight is provided within a first area of the cover, and at least a portion of the first tab portion and the second tab portion are provided outside of the first area.

6. The display device of claim 4, wherein the at least one light guide panel is provided within a first area of the cover, and the at least a portion of the first tab portion and the second tab portion are provided outside of the first area.

7. The display device of claim 1, wherein the first optical sheet includes a plurality of tab portions, a first tab portion extending from the first side of the optical sheet and the first slot being provided on the first tab portion, a second tab portion extending from the second side of the optical sheet and the second slot being provided on the second tab portion, and a third tab portion extending from the third side of the optical sheet and the third slot being provided on the third tab portion.

8. The display device of claim 1, wherein the third rail has a first width and a first length and the third slot has a first width and a first length, the first width of the third slot being larger than the first width of the third rail by 2 mm to 10 mm, and the first length of the third slot being larger than the first length of the third rail by 0.15 mm to 1.3 mm.

9. The display device of claim 1, wherein the first rail has a first width and a first length and the first slot has a first width and a first length, the first width of the first slot being larger than the first width of the first rail by 0.2 mm to 2 mm, and the first length of the first slot being larger than the first length of the first rail by 0.15 mm to 1.3 mm.

10. The display device of claim 1, wherein the second rail has a first width and a first length and the second slot has a first width and a first length, the first width of the second slot being larger than the first width of the second rail by 2 mm to 10 mm, and the first length of the second slot being larger than the first length of the second rail by 0.2 mm to 2 mm.

11. A display device comprising:
a display panel having a plurality of electrodes and pixels;
a backlight provided adjacent to the display panel;
at least one optical sheet provided between the display panel and the backlight, the at least one optical sheet including a first optical sheet; and
a cover provided adjacent to the display panel or the backlight, wherein
the cover includes a first rail near a first side of the cover and a second rail near a second side of the cover, the first and second sides being opposite sides,
the first optical sheet has a first slot near a first side and a second slot near a second side,
the first and second sides being opposite sides of the first optical sheet, and
the first slot is fitted over the first rail and the second slot is fitted over the second rail,
wherein the cover further includes a third rail near a third side, which is between the first and second sides, and the first optical sheet further includes a third slot near third side, which is between the first and second sides of the first optical sheet, the third slot being fitted over the third rail, and
wherein a length of the first slot in a direction parallel to the first side is less than a length of the second slot in a direction parallel to the second side and a length of the third slot in a direction parallel to the third side.

12. The display device of claim 11, wherein the first and second rails have the same size.

13. The display device of claim 11, wherein the first optical sheet includes a plurality of tab portions, a first tab portion extending from the first side of the optical sheet and the first slot being provided on the first tab portion, and a second tab portion extending from the second side of the optical sheet and the second slot being provided on the second tab portion.

14. The display device of claim 13, wherein the backlight is provided within a first area of the cover, and at least a portion of the first tab portion and the second tab portion are provided outside of the first area.

15. The display device of claim 13, wherein the at least one light guide panel is provided within a first area of the cover, and the at least a portion of the first tab portion and the second tab portion are provided outside of the first area.

16. The display device of claim 11, wherein the first rail has a first width and a first length and the first slot has a first width and a first length, the first width of the first slot being larger than the first width of the first rail by 0.2 mm to 2 mm, and the first length of the first slot being larger than the first length of the first rail by 0.15 mm to 1.3 mm.

17. The display device of claim 11, wherein the second rail has a first width and a first length and the second slot has a first width and a first length, the first width of the second slot being larger than the first width of the second rail by 2 mm to 10 mm, and the first length of the second slot being larger than the first length of the second rail by 0.2 mm to 2 mm.

18. The display device of claim 11, wherein the first side and the second side of the optical sheet is longer than the third side of the optical sheet.

* * * * *